United States Patent
Seo et al.

(10) Patent No.: US 12,109,647 B2
(45) Date of Patent: Oct. 8, 2024

(54) METHOD FOR PRODUCING HOLLOW CONTAINER

(71) Applicant: NIPPON LIGHT METAL COMPANY, LTD., Tokyo (JP)

(72) Inventors: Nobushiro Seo, Shizuoka (JP); Keita Oikawa, Shizuoka (JP); Ryo Yoshida, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 361 days.

(21) Appl. No.: 17/611,864

(22) PCT Filed: Feb. 7, 2020

(86) PCT No.: PCT/JP2020/004920
§ 371 (c)(1),
(2) Date: Nov. 16, 2021

(87) PCT Pub. No.: WO2020/235149
PCT Pub. Date: Nov. 26, 2020

(65) Prior Publication Data
US 2022/0226927 A1     Jul. 21, 2022

(30) Foreign Application Priority Data

May 17, 2019   (JP) ................................ 2019-093483
May 17, 2019   (JP) ................................ 2019-093484

(51) Int. Cl.
*B23K 20/00*      (2006.01)
*B23K 20/12*      (2006.01)
*B23K 103/10*     (2006.01)

(52) U.S. Cl.
CPC ...... *B23K 20/1225* (2013.01); *B23K 20/1255* (2013.01); *B23K 2103/10* (2018.08)

(58) Field of Classification Search
CPC ............ B23K 20/1255; B23K 20/1215; B23K 20/1265; B23K 20/1225; B23K 20/125; B23K 20/122
See application file for complete search history.

(56) References Cited

U.S. PATENT DOCUMENTS 10,906,127 B2 *    2/2021   Seo .................... B23K 20/1265
11,229,972 B2 *    1/2022   Masaki .............. B23K 20/2336
(Continued)

FOREIGN PATENT DOCUMENTS

| CN | 103962715 A | 8/2014 |
| CN | 105108311 A | 12/2015 |

(Continued)

OTHER PUBLICATIONS

International Search Report for No. PCT/JP2020/004920 (Apr. 14, 2020).

(Continued)

*Primary Examiner* — Erin B Saad
(74) *Attorney, Agent, or Firm* — Merchant & Gould P.C.

(57)  ABSTRACT

A method for manufacturing a hollow container with use of a rotary tool including a tapered stirring pin, including: preparing a first metal member, a second metal member, and an auxiliary member; butting the first metal member and the second metal member to face with each other, the auxiliary member is interposed between the first metal member and the second metal member; and joining the first metal member with the second metal member via the auxiliary member. The first and second metal members, and the auxiliary member are made of aluminum or an aluminum alloy, and the first and second metal members have higher hardness than the auxiliary member. At least one of the first and second metal members has an inclined surface inclined outward, and the auxiliary member has an inclined surface, (Continued)

tapered from the external surface toward an internal surface, on at least one of the side surfaces.

24 Claims, 20 Drawing Sheets

(56) References Cited

U.S. PATENT DOCUMENTS

| | | | |
|---|---|---|---|
| 11,241,756 B2* | 2/2022 | Hori | B23K 33/00 |
| 11,305,374 B2* | 4/2022 | Luszczak | F02F 1/10 |
| 11,389,892 B2* | 7/2022 | Hori | B23K 20/129 |
| 2003/0024965 A1* | 2/2003 | Okamura | B23K 33/00 |
| | | | 228/112.1 |
| 2003/0075584 A1* | 4/2003 | Sarik | B23K 20/122 |
| | | | 228/2.1 |
| 2006/0108394 A1 | 5/2006 | Okaniwa et al. | |
| 2008/0096038 A1 | 4/2008 | Nagano | |
| 2012/0193401 A1* | 8/2012 | Hori | B23K 20/1265 |
| | | | 228/2.1 |
| 2017/0001257 A1* | 1/2017 | Seo | B23K 20/1265 |
| 2018/0043465 A1* | 2/2018 | Hori | B23K 20/127 |
| 2021/0146473 A1* | 5/2021 | Hori | B23K 20/129 |
| 2021/0213561 A1* | 7/2021 | Hori | B23K 20/1255 |
| 2022/0347788 A1* | 11/2022 | Hori | B23K 20/1245 |

FOREIGN PATENT DOCUMENTS

| | | |
|---|---|---|
| JP | 2000-237881 A | 9/2000 |
| JP | 2006-061983 A | 3/2006 |
| JP | 2007-083242 A | 4/2007 |
| WO | 2004/043642 A1 | 5/2004 |
| WO | 2016/132768 A1 | 8/2016 |

OTHER PUBLICATIONS

Office Action for Chinese Patent Application No. 202080031284.4 (Jul. 8, 2022).
Search Report for European Patent Application No. 20809380.7 (Jun. 6, 2023).
Office Action for Korean Patent Application No. 10-2021-7033714 (Jun. 9, 2023).

* cited by examiner

METHOD FOR PRODUCING HOLLOW CONTAINER

This application is a National Stage Application of PCT/JP2020/004920, filed Feb. 7, 2020, which claims benefit of priority to Japanese Patent Application No. 2019-093483, filed May 17, 2019 and Japanese Patent Application No. 2019-093484, filed May 17, 2019, and which applications are incorporated herein by reference. To the extent appropriate, a claim of priority is made to each of the above disclosed applications.

TECHNICAL FIELD

The present invention relates to a method for producing a hollow container.

RELATED ART

For example, Patent Document 1 discloses an invention to perform friction-stir joining on a pair of metal members having a plate shape, with use of a rotary tool. In the invention, an auxiliary member softer than the metal members is interposed therebetween, and the rotary tool is inserted into the auxiliary member to perform friction stirring. Performing friction-stir joining on metal members having high hardness severely damages the rotary tool so that tool cost is increased. However, with the invention, the rotary tool is inserted into the soft auxiliary member to perform friction-stir joining so that the metal members having high hardness are suitably joined to each other.

RELATED ART DOCUMENT

Patent Document

Patent Document 1: Japanese Patent Application Publication No. 2007-83242

SUMMARY OF THE INVENTION

Problems to be Solved by the Invention

In the conventional joining method, a stirring pin of the rotary tool has a columnar shape, to have a problem that the stirring pin is not easily inserted into the auxiliary member. Further, friction stirring is performed with a shoulder of the rotary tool kept in contact with the metal members, to have a large load reacting on a friction stirring device.

In view of such problems, the present invention is intended to provide a method for producing a hollow container using a joining method, with which metal members having high hardness are suitably joined to each other.

To solve the problems described above, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame shape; butting, in which an end surface of the peripheral wall of the first metal member and an end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, and the end surface of the peripheral wall of at least one of the first metal member and the second metal member has an inclined surface to face outward, and the auxiliary member has an inclined surface, which is tapered from the external surface toward an internal surface, on at least one side surface.

Further, a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame shape; butting, in which an end surface of the peripheral wall of the first metal member and an end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, and the end surfaces of the peripheral walls of the first metal member and the second metal member have inclined surfaces to face outward, and the auxiliary member has inclined surfaces, which are tapered from the external surface toward an internal surface, on both side surfaces.

Further, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame shape; butting, in which an end surface of the peripheral wall of the first metal member and an end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, the end surface of the peripheral wall of at least one of the first metal member and the second metal member has an inclined surface to face outward, and the auxiliary member has an inclined surface, which is tapered from the external surface toward an internal surface, on at least one of the side surfaces, and has a protrusion, which extends on at least one of the side surfaces side, on the internal surface.

Further, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame shape; butting, in which an end surface of the peripheral wall of the first metal member and an end surface of the peripheral wall of the second metal member are faced with each other, the auxiliary member is interposed in a gap between the end surfaces, the end surface of the peripheral wall of the first metal member is butted against with one side surface of the auxiliary member to form a first butted portion, and the end surface of the peripheral wall of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, the end surfaces of the peripheral walls of the first metal member and the second metal member have inclined surfaces to face outward, and the auxiliary member has inclined surfaces, which are tapered from the external surface toward an internal surface, on both of the side surfaces, and has a protrusion, which extends on at least one of the side surfaces side, on the internal surface.

The method for manufacturing a hollow container uses the rotary tool including the tapered stirring pin, which is easily inserted into the auxiliary member. Further, only the stirring pin is inserted into the auxiliary member so that a load reacting on a friction stirring device is reduced. Further, the rotary tool is inserted into the auxiliary member which is softer than the first metal member and the second metal member, to allow the rotary tool to have a longer service life. Still further, the stirring pin is slightly brought in contact with the first metal member and the second metal member, so that joining strength is increased.

Further, when the protrusion, which extends on at least one side surface side, is provided on the internal surface of the auxiliary member, the auxiliary member is prevented from coming off at a time of friction stirring. Accordingly, the auxiliary member is prevented from being displaced with respect to the first metal member and the second metal member, to perform friction-stir joining more suitably.

Further, in the joining step, the rotary tool is desirably moved over an entire outer peripheral surfaces of the first metal member and the second metal member. With this setting, a hollow container has increased sealing property.

Further, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a plate shape, and an auxiliary member having a frame shape; butting, in which an end surface of the peripheral wall of the first metal member and a peripheral edge on an internal surface of the second metal member are faced with each other, the auxiliary member is interposed in a gap between the end surface and the peripheral edge, the end surface of the peripheral wall of the first metal member is butted against one side surface of the auxiliary member to form a first butted portion, and the peripheral edge on the internal surface of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, and at least one of the end surface of the peripheral wall of the first metal member and the peripheral edge on the internal surface of the second metal member has an inclined surface to face outward, and the auxiliary member has an inclined surface, which is tapered from the external surface toward an internal surface, on at least one side surface.

Further, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a plate shape, and an auxiliary member having a frame shape; butting, in which an end surface of the peripheral wall of the first metal member and a peripheral edge on an internal surface of the second metal member are faced with each other, the auxiliary member is interposed in a gap between the end surface and the peripheral edge, the end surface of the peripheral wall of the first metal member is butted against one side surface of the auxiliary member to form a first butted portion, and the peripheral edge on the internal surface of the second metal member is butted against the other side surface of the auxiliary member to form a second butted portion; and joining, in which the rotating rotary tool is inserted only through an external surface of the auxiliary member and relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, and the end surface of the peripheral wall of the first metal member and the peripheral edge on the internal surface of the second metal member have inclined surfaces to face outward, and the auxiliary member has inclined surfaces, which are tapered from the external surface toward an internal surface, on both side surfaces.

Further, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a plate shape, and an auxiliary member having a frame shape; butting, in which an end surface of the peripheral wall of the first metal member and a peripheral edge on an internal surface of the second metal member are faced with each other, the auxiliary member is interposed in a gap between the end surface and the peripheral edge, the end surface of the peripheral wall of the first metal member is butted against one side surface of the auxiliary member to form a first butted portion, and the peripheral edge on the internal surface of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, and at least one of the end surface of the peripheral wall of the first metal member and the peripheral edge on the internal surface of the second metal member has an inclined surface to face outward, and the auxiliary member has an inclined surface, which is tapered from the external surface toward an internal surface, on at least one side surface, and has a protrusion, which extends on the at least one side surface side, on the internal surface.

Further, the present invention provides a method for manufacturing a hollow container with use of a rotary tool including a tapered stirring pin, the method including: preparing a first metal member having a concave portion which is formed by a bottom and a peripheral wall extending from a peripheral edge of the bottom, a second metal member having a plate shape, and an auxiliary member having a frame shape; butting, in which an end surface of the peripheral wall of the first metal member and a peripheral edge on an internal surface of the second metal member are faced with each other, the auxiliary member is interposed in a gap between the end surface and the peripheral edge, the end surface of the peripheral wall of the first metal member is butted against one side surface of the auxiliary member to form a first butted portion, and the peripheral edge on the internal surface of the second metal member is butted against with the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin slightly contacting the first and second metal members, to join the first metal member to the second metal member via the auxiliary member, wherein the first metal member, the second metal member, and the auxiliary member are made of aluminum or an aluminum alloy, and the first metal member and the second metal member have higher hardness than the auxiliary member, and the end surface of the peripheral wall of the first metal member and the peripheral edge on the internal surface of the second metal member have inclined surfaces to face outward, and the auxiliary member has inclined surfaces, which are tapered from the external surface toward an internal surface, on both of the side surfaces, and has a protrusion, which extends on at least one of the side surfaces side, on the internal surface.

The method for manufacturing a hollow container uses the rotary tool including the tapered stirring pin, which is easily inserted into the auxiliary member. Further, only the stirring pin is inserted into the auxiliary member so that a load reacting on a friction stirring device is reduced. Still further, the rotary tool is inserted into the auxiliary member which is softer than the first metal member and the second metal member, to allow the rotary tool to have a longer service life. Yet further, the stirring pin is slightly brought in contact with the first metal member and the second metal member, so that joining strength is increased.

Further, when the protrusion, which extends on at least one side surface side, is provided on the internal surface of the auxiliary member, the auxiliary member is prevented from coming off at a time of friction stirring. Accordingly, the auxiliary member is prevented from being displaced with respect to the first metal member and the second metal member, to perform friction-stir joining more suitably.

Further, in the joining step, the rotary tool is desirably moved over around the first metal member and the second metal member. With this setting, a hollow container has increased sealing property.

Further, when the first metal member and the second metal member are made of a cast material, and the auxiliary member is made of an expansile material, the cast materials are suitably joined to each other.

Advantageous Effects of the Invention

With the method for producing a hollow container according to the present embodiment, metal members having high hardness are suitably joined to each other to form a hollow container.

DETAILED DESCRIPTION OF THE INVENTION

First Embodiment

Figure 5:
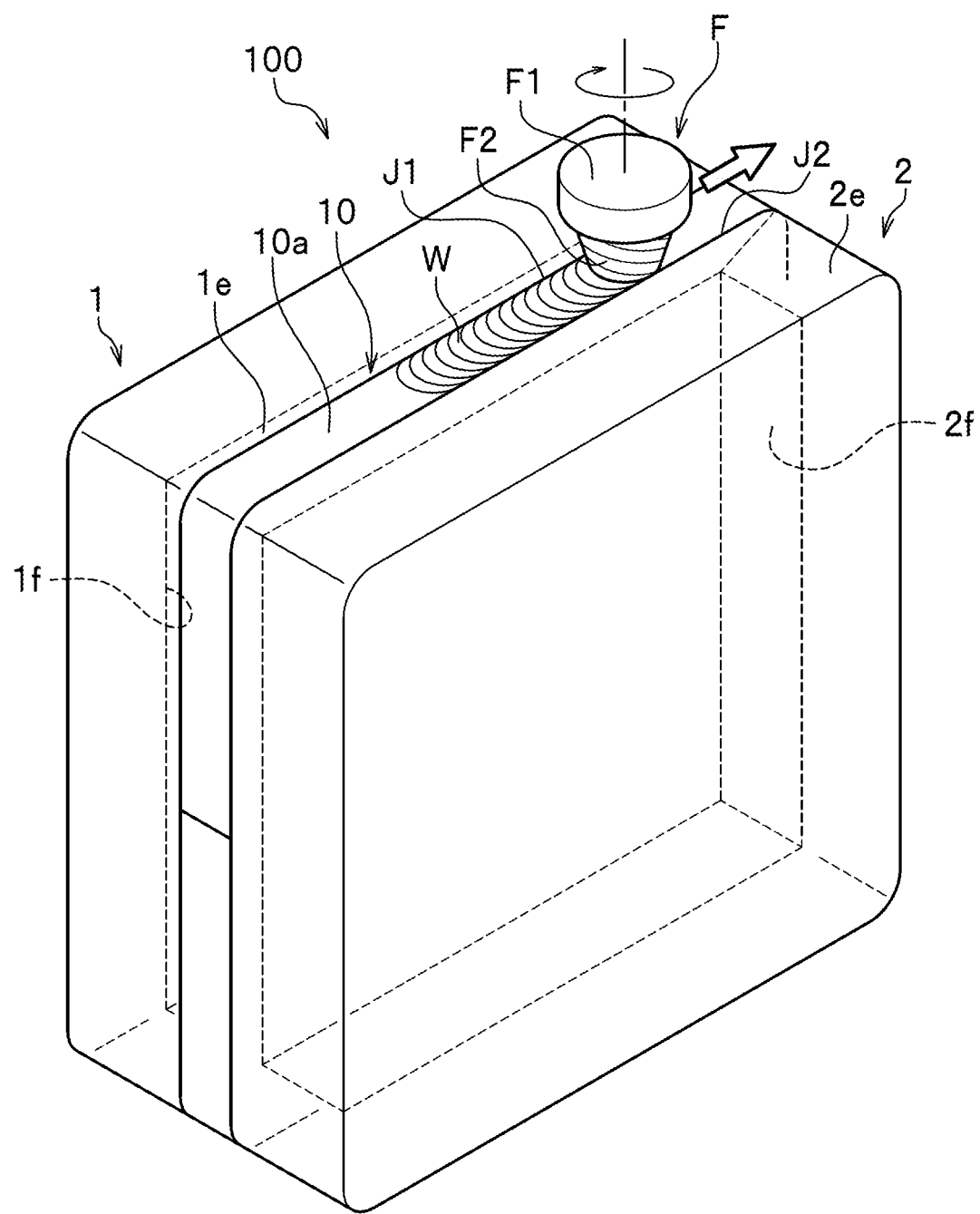
FIG. 5 is a perspective view of the components in the joining step of the method for producing a hollow container according to the first embodiment.

A description is given of a first embodiment of the present invention with reference to the drawings as appropriate. A method for producing a hollow container according to the first embodiment includes a preparing step, a butting step, and a joining step. As illustrated in FIG. 5, in the present embodiment, friction-stir joining is performed on a first metal member 1 and a second metal member 2 to produce a hollow container 100.

In the description below, an "outer surface" is a surface opposite to an "inner surface". Further, in the description below, an "outer peripheral surface" is a surface opposite to an "inner peripheral surface". Still further, an "external surface" is a surface opposite to an "internal surface".

Figure 1:
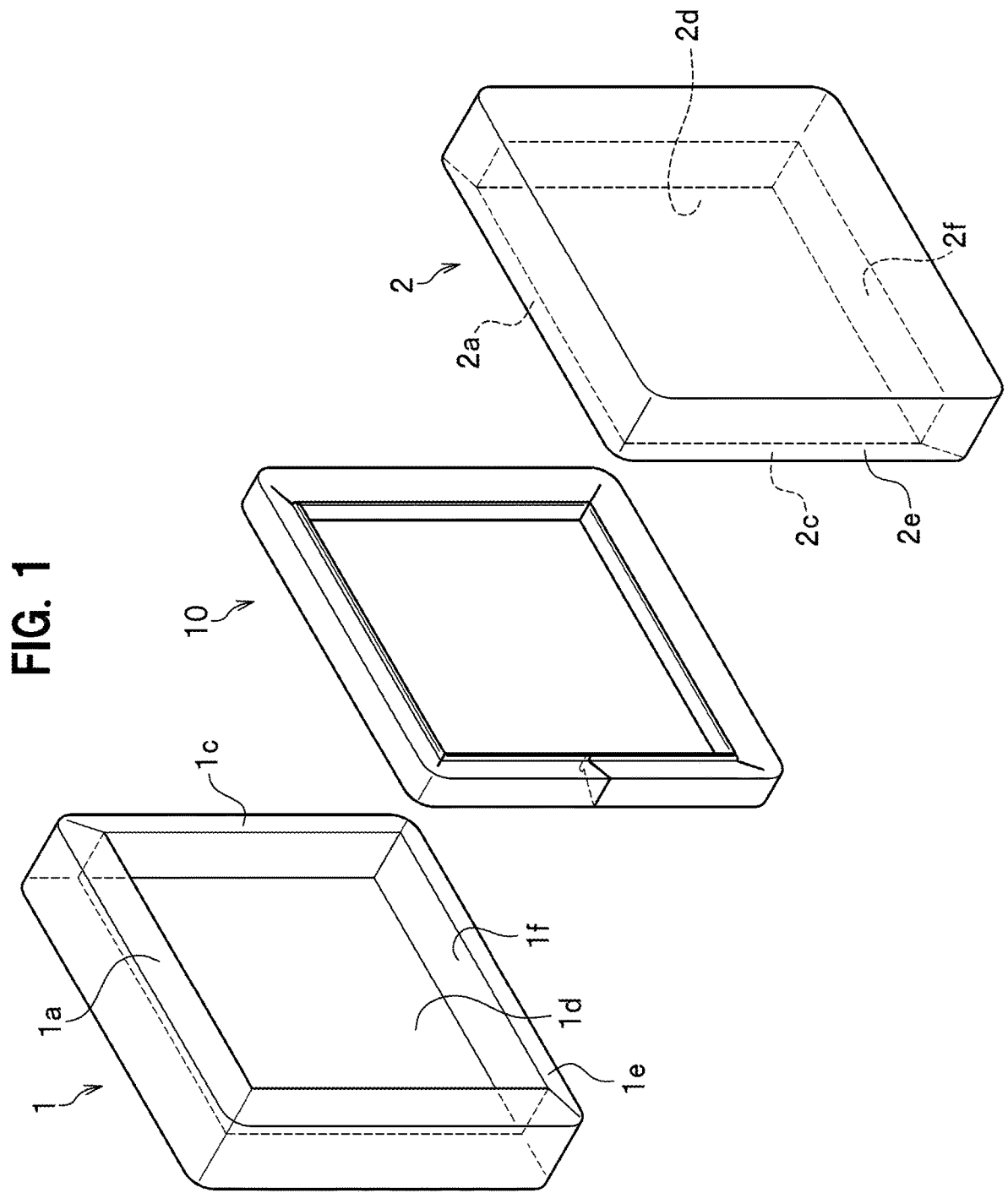
FIG. 1 is a perspective view of components in a preparing step of a method for producing a hollow container according to a first embodiment of the present invention.

As illustrated in FIG. 1, in the preparing step, the first metal member 1, the second metal member 2, and an auxiliary member 10 are prepared.

The first metal member 1 and second metal member 2 are metal members having a square plate shape. The first metal member 1 and second metal member 2 have the same thickness as each other. The first metal member 1 and second metal member 2 are not particularly limited as long as the members are made of metals to be frictionally stirrable, and may be made of aluminum or an aluminum alloy, for example. In the present embodiment, cast material is used for the first metal member 1 and second metal member 2, and the cast material is an aluminum alloy such as JISH5302 ADC12 (Al—Si—Cu series alloy).

The first metal member 1 has, on a center portion of an inner surface 1c thereof, a concave portion 1f formed by a square bottom 1d and a peripheral wall 1e, which has a square tube shape and extends from a peripheral edge of the bottom 1d.

The second metal member 2 has, on a center portion of an inner surface 2c thereof, a concave portion 2f formed by a square bottom 2d, and a peripheral wall 2e, which has a square tube shape and extends from a peripheral edge of the bottom 2d.

Figure 3:
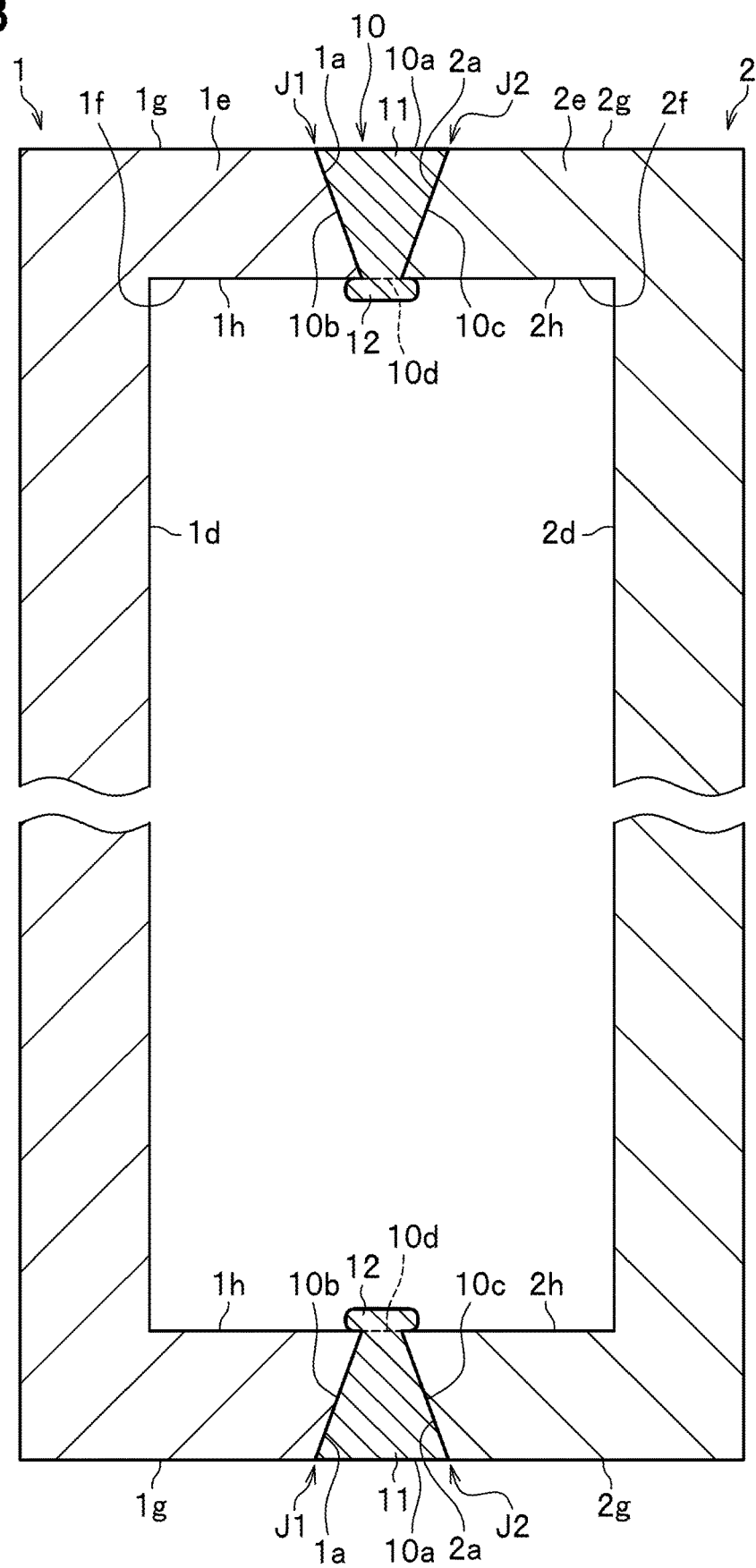
FIG. 3 is a cross-sectional view of the components in a butting step of the method for producing a hollow container according to the first embodiment.

As illustrated in FIG. 3, the first metal member 1 has an end surface 1a of the peripheral wall 1e formed into an inclined surface to face outward (toward an end surface 2a of the peripheral wall 2e of the second metal member 2). The second metal member 2 has the end surface 2a of the peripheral wall 2e formed into an inclined surface to face outward (toward the end surface 1a of the peripheral wall 1e of the first metal member 1).

Thus, the end surface 1a and end surface 2a are inclined surfaces to face each other so as to be further away from each other with an increasing distance from inner peripheral surfaces 1h, 2h toward outer peripheral surfaces 1g, 2g of the peripheral walls 1e, 2e. Inclination angles of the end surfaces 1a, 2a are the same as each other with respect to an imaginary orthogonal plane orthogonal to the outer peripheral surface 1g of the peripheral wall 1e.

As illustrated in FIG. 1, the auxiliary member 10 is a member having a substantially square frame shape, to be interposed between the first metal member 1 and second metal member 2. The auxiliary member 10 is made of a metal having hardness lower than the first metal member 1. The auxiliary member 10 is formed of expansile material, which is an aluminum alloy such as JIS A1050, A1100, A6063.

Figure 2:
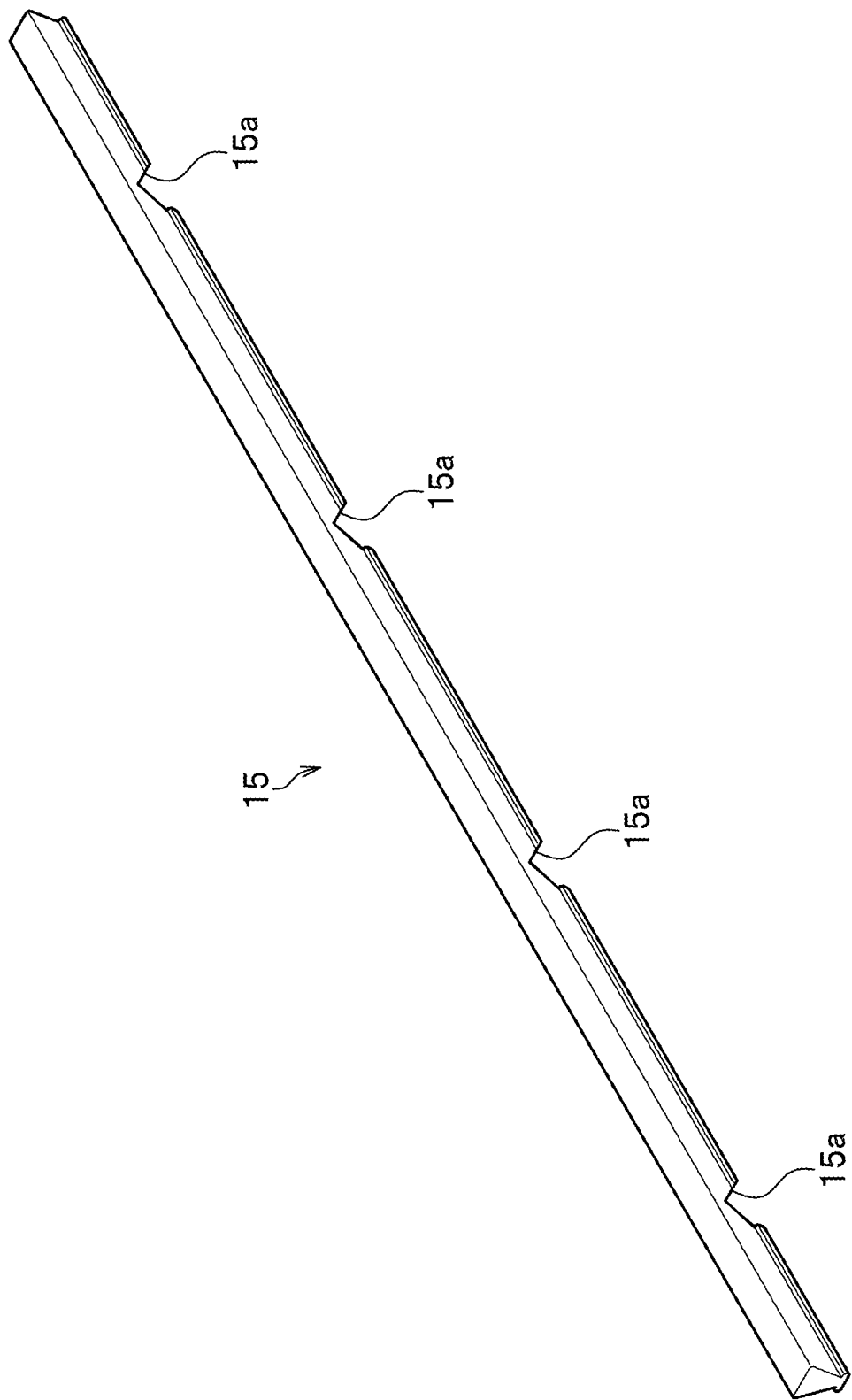
FIG. 2 is a perspective view of an auxiliary member according to the first embodiment, in an unprocessed state.

As illustrated in FIG. 2, the auxiliary member 10 is formed of an elongated member 15 which is an extruded member having a substantially trapezoidal shape in cross section. The elongated member 15 has four notches 15a in a surface to form an inner periphery of the auxiliary member 10 at intervals in a longitudinal direction (see FIG. 3). The elongated member 15 is bent orthogonally at the notches 15a and both ends of the elongated member 15a are butted to form the auxiliary member 10 having a square frame shape, as illustrated in FIG. 1. Note that the auxiliary member 10 having a flame shape may be formed by die casting, for example.

As illustrated in FIG. 3, the auxiliary member 10 includes a main body 11 having a trapezoidal shape in cross section and a protrusion 12 protruding inward from an inner peripheral surface 10d of the main body 11.

The main body 11 includes an outer peripheral surface (external surface) 10a, side surfaces 10b and 10c, and an inner peripheral surface (internal surface) 10d. The side surfaces 10b, 10c are inclined surfaces to come closer with each other with an increasing distance from the outer peripheral surface 10a (toward the inner peripheral surface 10d). That is, the side surfaces 10b, 10c of the auxiliary member 10 are inclined surfaces tapered from the outer peripheral surface 10a toward the inner peripheral surface 10d. Inclination angles of the side surfaces 10b, 10c are the same as the inclination angles of the end surfaces 1a, 2a which face the side surfaces 10b, 10c, respectively.

The protrusion 12 has a rectangular shape in cross section which is wider than the inner peripheral surface (internal surface) 10d of the main body 11. The protrusion 12 is formed to have a predetermined shape in a circumferential direction of the auxiliary member 10.

As illustrated in FIG. 3, in the butting step, the first metal member 1 is butted against the second metal member 2, having the auxiliary member 10 therebetween. In the butting step, the end surface 1a of the first metal member 1 is arranged to face the end surface 2a of the second metal member 2. Further, the auxiliary member 10 is arranged between the end surfaces 1a, 2a, to be interposed in a gap between the end surfaces 1a, 2a.

The end surface 1a of the first metal member 1 is butted against the side surface 10b of the auxiliary member 10 so as to substantially surface-contact with each other, to form a butted portion J1. The end surface 2a of the second metal member 2 is butted against the side surface 10c of the auxiliary member 10 so as to substantially surface-contact with each other, to form a butted portion J2. The outer peripheral surface (external surface) 10a of the auxiliary member 10 is flush with the outer peripheral surface 1g of the first metal member 1 and the outer peripheral surface 2g of the second metal member 2. The inner peripheral surface 10d of the auxiliary member 10 is flush with the inner peripheral surface 1h of the first metal member 1 and the inner peripheral surface 2h of the second metal member 2. Further, the protrusion 12 is locked to the inner peripheral surface 1h of the first metal member 1 and the inner peripheral surface 2h of the second metal member 2, respectively.

Figure 4:
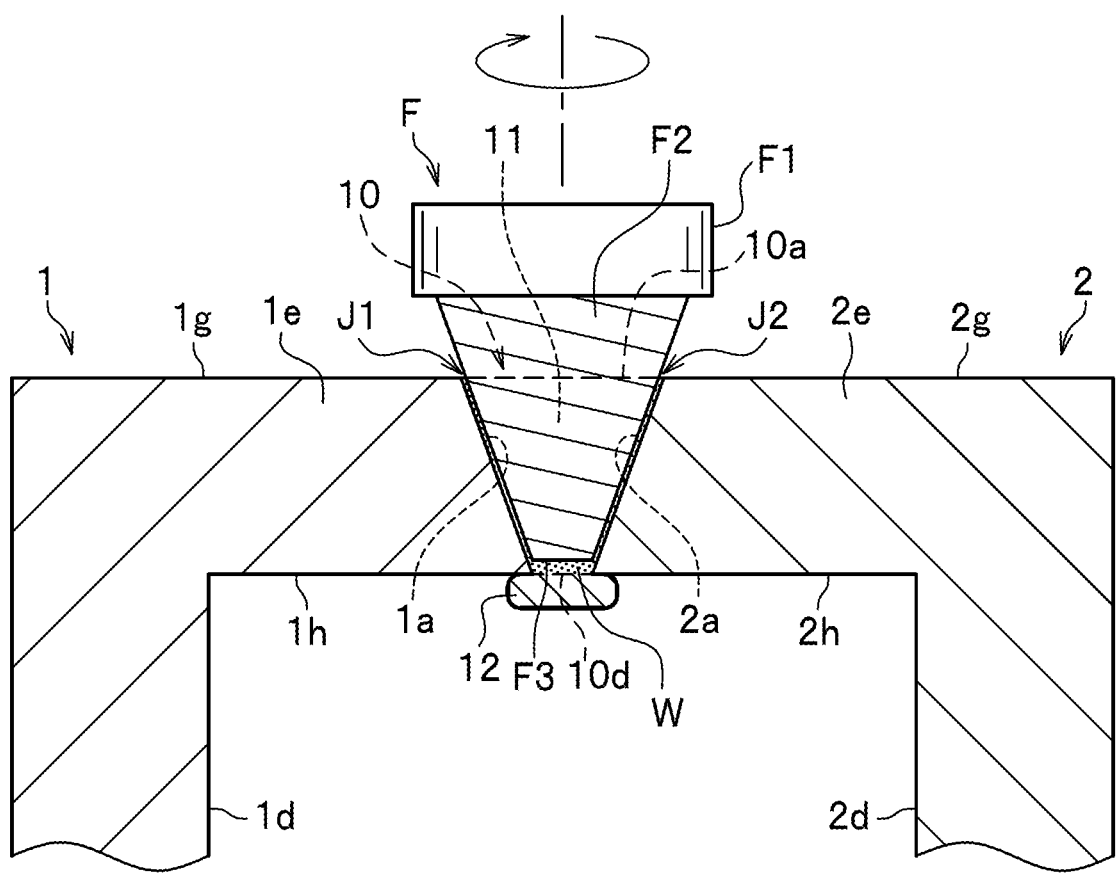
FIG. 4 is a cross-sectional view of the components in a joining step of the method for producing a hollow container according to the first embodiment.

As illustrated in FIG. 4, a rotary tool F includes a base F1 and a stirring pin F2. The rotary tool F is made of tool steel, for example. The base F1 is a portion connected to a rotation shaft of a friction stirring device. The stirring pin F2 extends downward from the base F1 to have a tapered shape. The stirring pin F2 has, at a tip thereof, a flat surface F3 perpendicular to a central axis for rotation. The flat surface F3 is formed to have a size slightly larger than the inner peripheral surface (internal surface) 10d of the auxiliary member 10.

A taper angle of an outer peripheral surface of the stirring pin F2 is the same as each of the inclination angles of the end surface 1a of the first metal member 1 and the end surface 2a of the second metal member 2. That is, a cross-sectional shape of the stirring pin F2 in a lateral view is substantially the same as a cross-sectional shape of the main body 11 of the auxiliary member 10.

A spiral groove is formed in the outer peripheral surface of the stirring pin F2. In the present embodiment, the rotary tool F is rotated clockwise so that the spiral groove is formed counterclockwise from a base end toward a tip. Note that, in a case where the rotary tool F is rotated counterclockwise, a spiral groove is formed clockwise from the base end toward the tip. Accordingly, plastically fluidized metal is guided by the spiral groove to move toward the tip, which prevents generation of burrs. The rotary tool F may be attached to an arm robot including a rotation driver at a tip thereof, for example.

As illustrated in FIG. 4, in the joining step, friction-stir joining is performed on the first metal member 1 and second metal member 2, with use of the rotary tool F. In the joining step, the stirring pin F2 of the rotary tool F being rotated clockwise is inserted into the center in a width direction of the outer peripheral surface (external surface) 10a of the main body 11 of the auxiliary member 10.

In the joining step, the outer peripheral surface of the stirring pin F2 may not be brought in contact with the end surface 1a of the first metal member 1 and the end surface 2a of the second metal member 2. However, in the present embodiment, the stirring pin F2 is relatively moved along the auxiliary member 10, with the outer peripheral surface of the stirring pin F2 being slightly in contact with both the end surfaces 1a, 2a. A contact margin between the outer peripheral surface of the stirring pin F2 and the end surfaces 1a, 2a may be appropriately set to be less than 1.0 mm, for example.

In the joining step, only the stirring pin F2 is brought in contact with the first metal member 1, the second metal member 2, and the auxiliary member 10, and friction stirring is performed with a part of the stirring pin F2, which is continuous with the base end, exposed on the outside of the first metal member 1 and second metal member 2. The flat surface F3 of the stirring pin F2 is inserted to a deep position as far as the flat surface F3 does not protrude from the inner peripheral surface 1h of the first metal member 1 and the inner peripheral surface 2h of the second metal member 2.

As illustrated in FIG. 5, the rotary tool F is relatively moved along the auxiliary member 10 over entire outer peripheral surfaces of the peripheral walls 1e, 2e of the first metal member 1 and second metal member 2. At this time, a start position is overlapped with an end position in the joining step. When reaching the end position, the rotary tool F is removed from the auxiliary member 10. As described above, friction-stir joining is performed on the butted portions J1, J2 simultaneously in one step. A plasticized region W is formed in a track of the rotary tool F.

Friction-stir joining is performed on the peripheral wall 1e of the first metal member 1 and the peripheral wall 2e of the second metal member 2 so that the concave portion 1f of the first metal member 1 and the concave portion 2f of the second metal member 2 are coupled with each other. This forms the hollow container 100 having an inner space therein defined by both the concave portions 1f, 2f.

According to the method for producing the hollow container 100 of the present embodiment described above, the rotary tool F including the tapered stirring pin F2 is used as illustrated in FIG. 4 to facilitate inserting the stirring pin F2 into the outer peripheral surface (external surface) 10a of the auxiliary member 10. Further, only the stirring pin F2 is inserted into the auxiliary member 10 and friction stirring is performed with a part of the stirring pin F2, which is continuous with the base end, exposed, so that a load reacting on the friction stirring device is reduced.

Further, the rotary tool F is inserted into the auxiliary member 10 which is softer than the first metal member 1 and second metal member 2, so that a service life of the rotary tool F is prolonged. Still further, the stirring pin F2 is only slightly brought in contact with the first metal member 1 and second metal member 2, so that a large amount of hard metal forming the first metal member 1 and second metal member 2 is prevented from being mixed into the auxiliary member 10. Therefore, joining strength is further increased.

Further, the end surface 1a of the first metal member 1 and the end surface 2a of the second metal member 2 are formed into the inclined surfaces, so that the stirring pin F2 is prevented from greatly coming in contact with the first metal member 1 and second metal member 2. Still further, in the present embodiment, the taper angle of the stirring pin F2 is substantially the same as (substantially in parallel with) the inclination angles of the end surfaces 1a, 2a so that friction stirring is performed in a well-balanced manner end-to-end in a height direction.

Further, when a length of material to be joined by friction-stir joining is long, the auxiliary member 10 is also formed long, accordingly. In such a case, friction-stir joining may result in the auxiliary member 10 coming off. However, according to the present embodiment, the auxiliary member 10 includes the protrusion 12 which is locked to the inner peripheral surfaces 1h, 2h so that the auxiliary member 10 is prevented from coming off. Accordingly, the auxiliary member 10 is prevented from being displaced with respect to the first metal member 1 and second metal member 2, so that friction-stir joining is performed more suitably.

Note that, in the present embodiment, the protrusion 12 is set to lock to both the first metal member 1 and second metal member 2. However, the protrusion 12 may be locked to at least one of the first metal member 1 and second metal member 2, in order to prevent the auxiliary member 10 from coming off.

Second Embodiment

Figure 6:
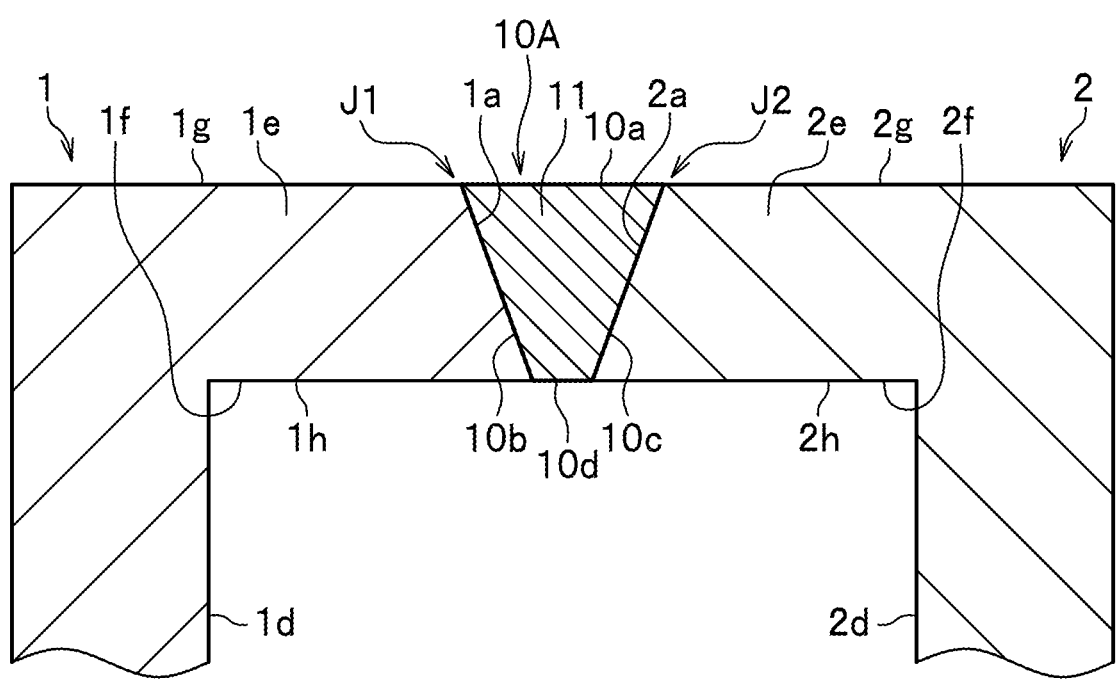
FIG. 6 is a cross-sectional view of components in a butting step of the method for producing a hollow container according to a second embodiment of the present invention.

Next, a description is given of a method for producing a hollow container according to a second embodiment of the present invention. FIG. 6 is a cross-sectional view of components in a butting step of the method for producing a hollow container according to the second embodiment of the present invention.

The method for producing a hollow container of the second embodiment includes a preparing step, the butting step, and a joining step. The second embodiment mainly differs from the first embodiment on the point that an auxiliary member 10A has a different shape. In the present embodiment, the description is focused on difference from the first embodiment.

As illustrated in FIG. 6, the first metal member 1 and second metal member 2 are the same as those in the first embodiment. The auxiliary member 10A is formed with the main body 11 having a trapezoidal shape in cross section. That is, the auxiliary member 10A of the second embodiment is configured without the protrusion 12 of the auxiliary member 10 (see FIG. 3) of the first embodiment.

In the butting step, as in the first embodiment, the first metal member 1 and the second metal member 2 are butted against the auxiliary member 10A from both sides. The end surface 1a of the first metal member 1 is butted against the side surface 10b of the auxiliary member 10A to form the butted portion J1. The end surface 2a of the second metal member 2 is butted against the side surface 10c of the auxiliary member 10A to form the butted portion J2.

In the joining step, friction-stir joining is performed on the butted portions J1, J2 with use of the rotary tool F, as in the first embodiment.

The second embodiment described above achieves substantially the same effects as the first embodiment. Further, the auxiliary member 10A of the second embodiment has a trapezoidal shape in cross section so that the auxiliary member 10A is easily made of extruded protrusion material.

Third Embodiment

Figure 7:
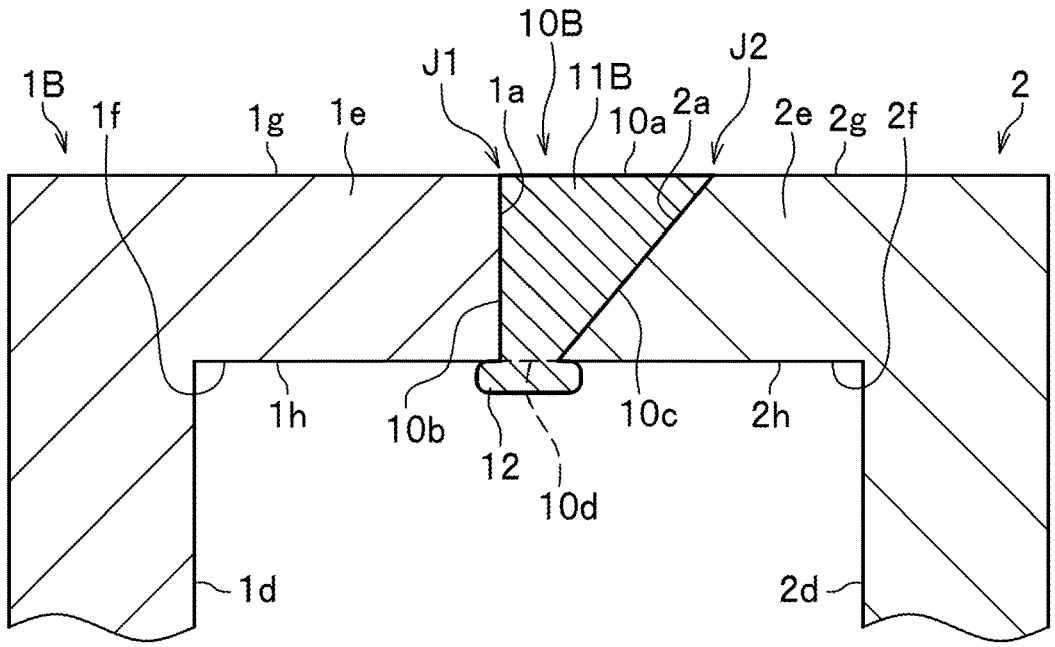
FIG. 7 is a cross-sectional view of components in a butting step of the method for producing a hollow container according to a third embodiment of the present invention.
Figure 8:
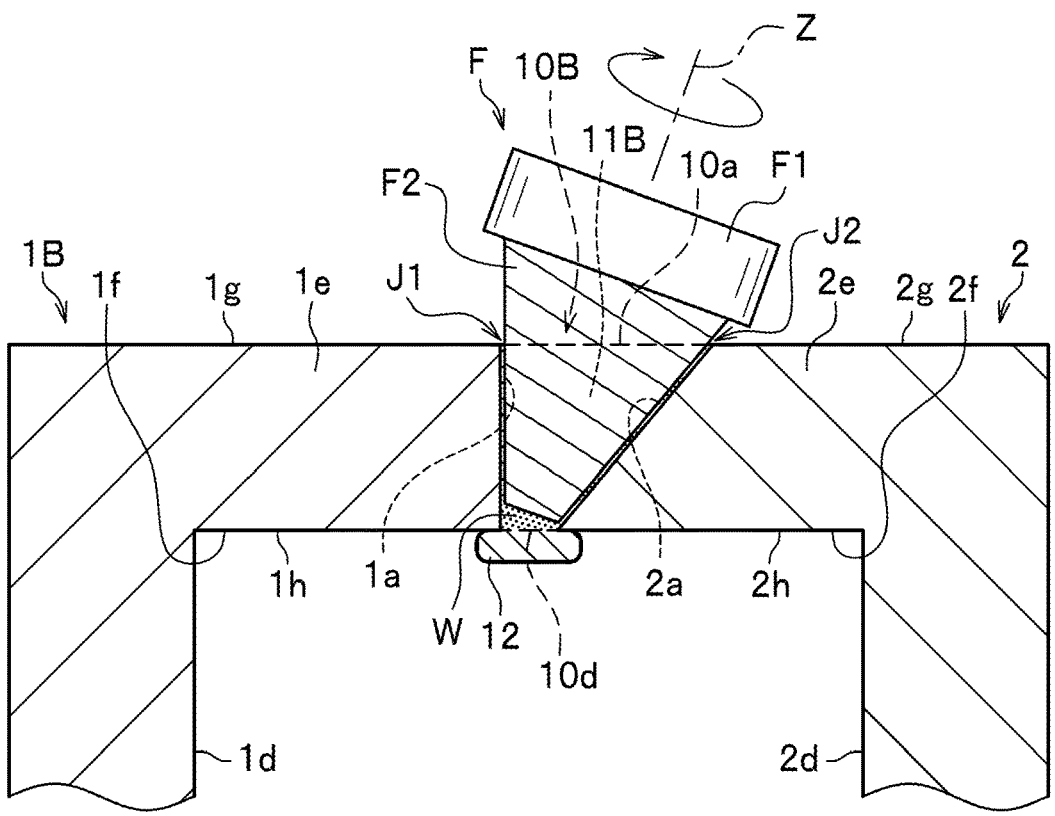
FIG. 8 is a cross-sectional view of the components in a joining step of the method for producing a hollow container according to the third embodiment.

Next, a description is given of a method for producing a hollow container according to a third embodiment of the present invention. FIG. 7 is a cross-sectional view of components in a butting step of the method for producing a hollow container according to the third embodiment of the present invention. FIG. 8 is a cross-sectional view of the components in a joining step of the method for producing a hollow container according to the third embodiment of the present invention.

The method for producing a hollow container according to the third embodiment includes a preparing step, the butting step, and the joining step. The third embodiment mainly differs from the first embodiment on the point that an auxiliary member 10B has a different shape. In the present embodiment, the description is focused on difference from the first embodiment.

In the preparing step, a first metal member 1B, the second metal member 2, and the auxiliary member 10B are prepared. The end surface 1a of the first metal member 1B is perpendicular to the outer peripheral surface 1g and the inner peripheral surface 1h. The second metal member 2 is the same as that in the first embodiment.

The auxiliary member 10B of the third embodiment includes a main body 11B having a trapezoidal shape in cross section and the protrusion 12 protruding inward from the inner peripheral surface 10d of the main body 11B. The main body 11B has the outer peripheral surface (external surface) 10a, the side surfaces 10b, 10c, and the inner peripheral surface (internal surface) 10d. The side surface 10b is perpendicular to the outer peripheral surface 10a. The side surface 10c is inclined to taper with an increasing distance from the outer peripheral surface 10a. An inclination angle of the side surface 10c is the same as that of the end surface 2a of the second metal member 2. The protrusion 12 is the same as that in the first embodiment. Note that the protrusion 12 may not be formed in the auxiliary member 10B of the third embodiment.

In the butting step, the first metal member 1B and second metal member 2 are butted against the auxiliary member 10B. The end surface 1a of the first metal member 1B is butted against the side surface 10b of the auxiliary member 10B to form the butted portion J1. The end surface 2a of the second metal member 2 is butted against the side surface 10c of the auxiliary member 10B to form the butted portion J2. The outer peripheral surface (external surface) 10a of the auxiliary member 10B is flush with the outer peripheral surface 1g of the first metal member 1B and the outer peripheral surface 2g of the second metal member 2. The inner peripheral surface (internal surface) 10d of the auxiliary member 10B is flush with the inner peripheral surface 1h of the first metal member 1B and the inner peripheral surface 2h of the second metal member 2.

As illustrated in FIG. 8, in the joining step, friction-stir joining is performed with use of the rotary tool F. In the third embodiment, only the stirring pin F2 of the rotary tool F is inserted into the auxiliary member 10B and is relatively moved along the auxiliary member 10B, with a part of the stirring pin F2, which is continuous with the base end, exposed, to perform friction-stir joining on the butted portions J1, J2.

Further, in the third embodiment, friction stirring is performed, with the outer peripheral surface of the stirring pin F2 being slightly in contact with the end surface 1a of the first metal member 1 and the end surface 2a of the second metal member 2 while a central axis for rotation Z of the stirring pin F2 being inclined toward the second metal member 2.

Note that an inclination angle of the rotary tool F may be set appropriately, but is preferably set such that the outer peripheral surface of the stirring pin F2 is in parallel with the end surface 1a of the first metal member 1B and the end surface 2a of the second metal member 2.

The method for producing a hollow container according to the third embodiment described above also achieves substantially the same effects as the first embodiment. Further, in the third embodiment, the end surface 1a of the first metal member 1B is not required to be an inclined surface, resulted in reduction in time and labor.

Fourth Embodiment

Figure 9:
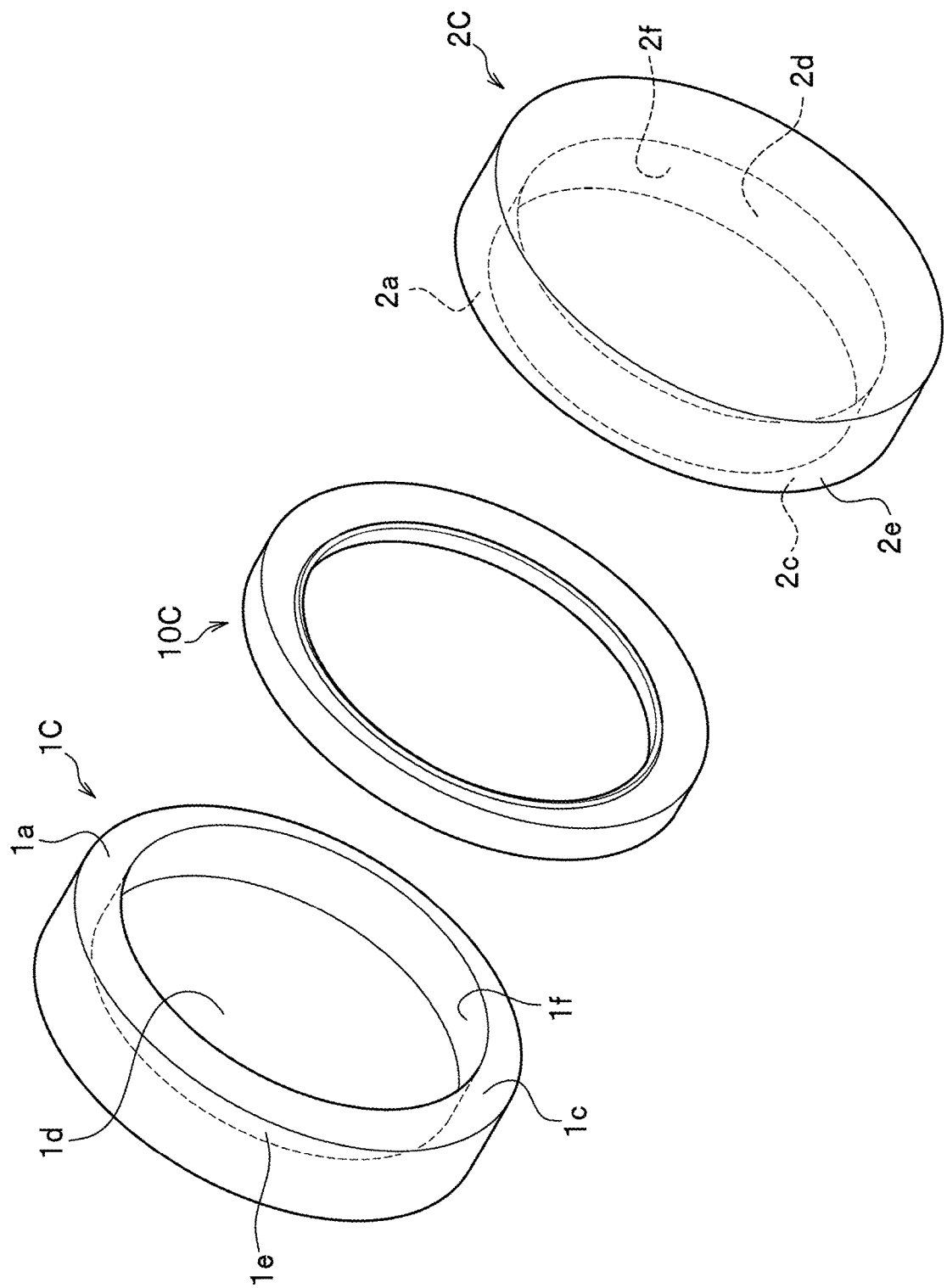
FIG. 9 is a perspective view of components in a preparing step of the method for producing a hollow container according to a fourth embodiment of the present invention.
Figure 10:
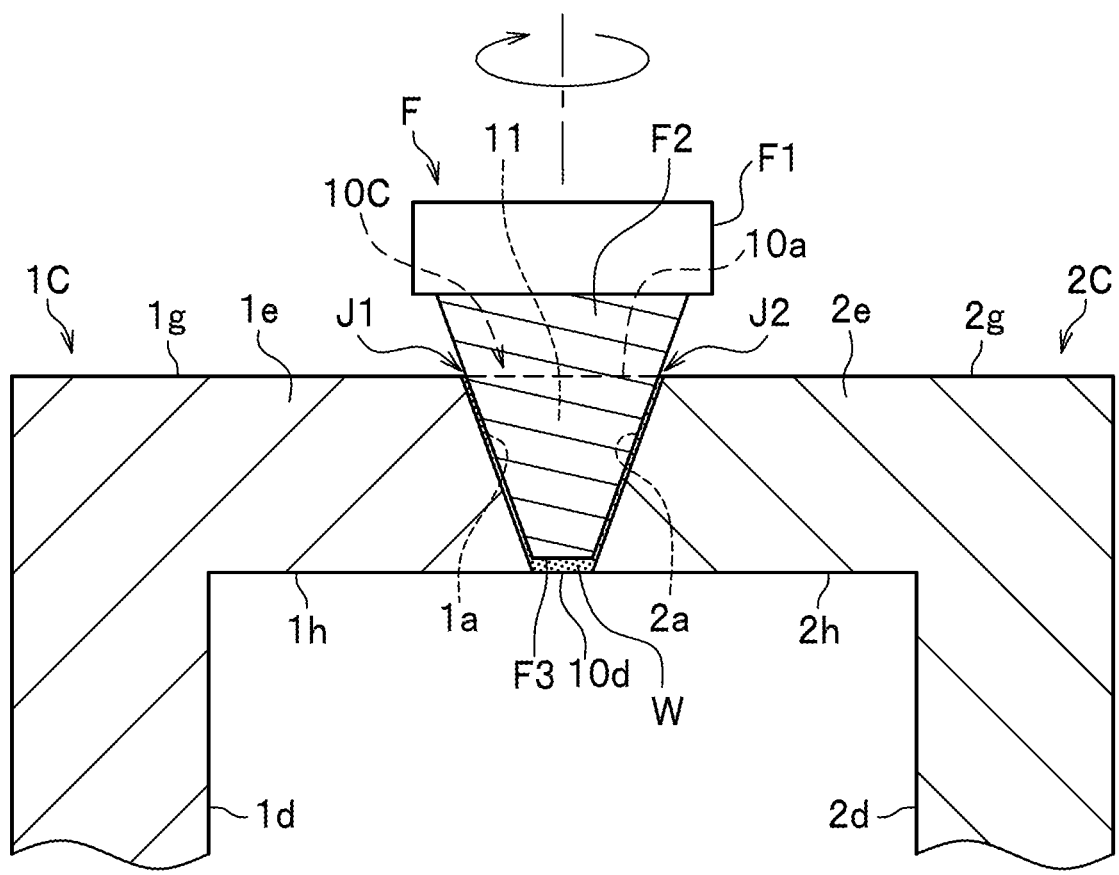
FIG. 10 is a cross-sectional view of the components in a joining step of the method for producing a hollow container according to the fourth embodiment.
Figure 11:
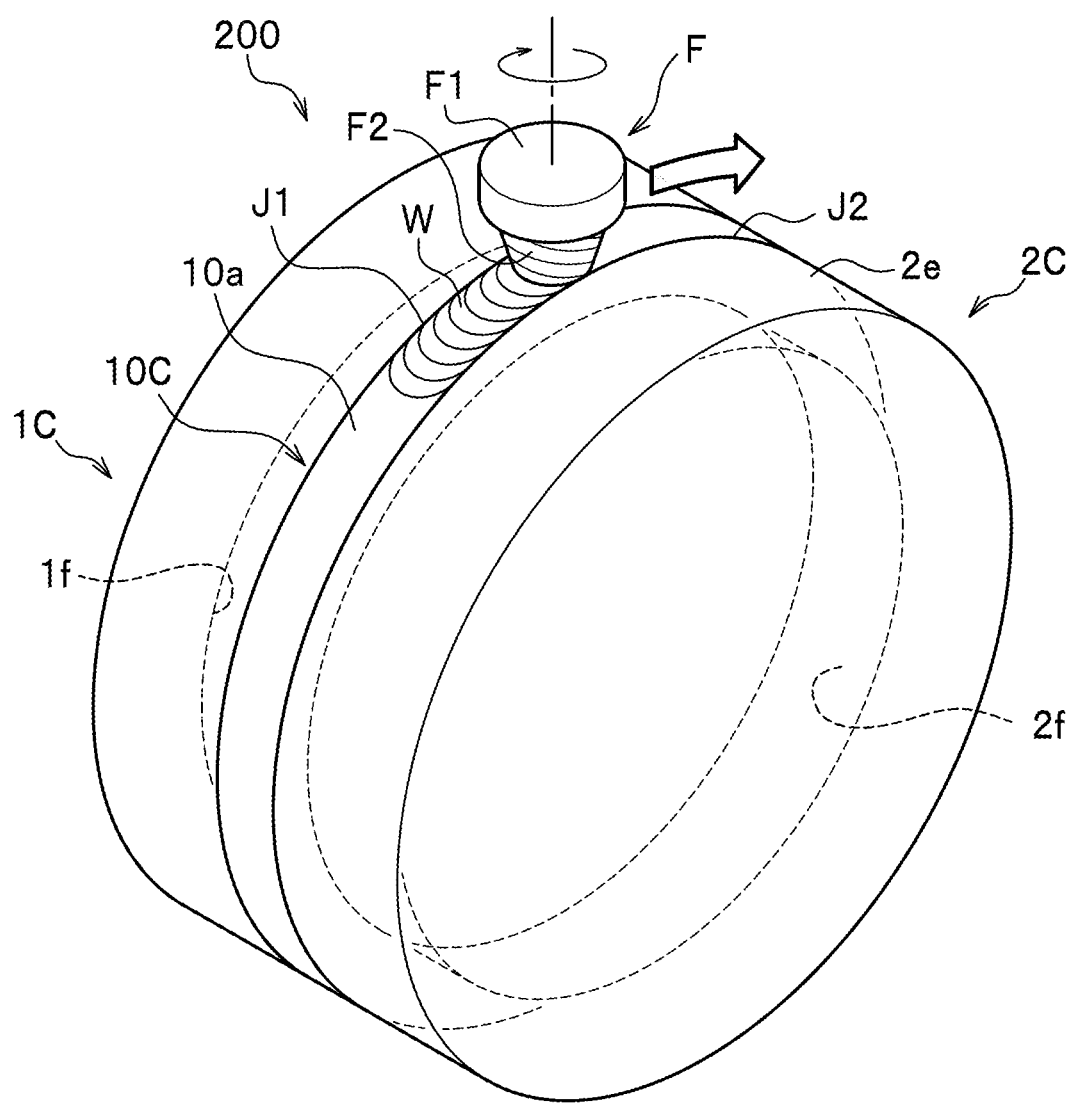
FIG. 11 is a perspective view of the components in the joining step of the method for producing a hollow container according to the fourth embodiment.

Next, a description is given of a method for producing a hollow container according to a fourth embodiment of the present invention. FIG. 9 is a perspective view of components in a preparing step of the method for producing a hollow container according to the fourth embodiment of the present invention. FIG. 10 is a cross-sectional view of the components in a joining step of the method for producing a hollow container according to the fourth embodiment. FIG. 11 is a perspective view of the components in the joining step of the method for producing a hollow container according to the fourth embodiment.

The method for producing a hollow container according to the fourth embodiment includes a preparing step, a butting step, and the joining step. The fourth embodiment mainly differs from the first embodiment on the point that a first metal member 1C, a second metal member 2C, and an auxiliary member 10C each have a different shape. In the present embodiment, the description is focused on difference from the first embodiment.

As illustrated in FIG. 9, the first metal member 1C in the fourth embodiment has, on a center portion of the inner surface 1c thereof, the concave portion 1f formed by the bottom 1d in a circular shape and the peripheral wall 1e, which has a cylindrical shape, extending from the peripheral edge of the bottom 1d.

The second metal member 2C in the fourth embodiment has, on a center portion of the inner surface 2c thereof, the concave portion 2f formed by the bottom 2d in a circular shape and the peripheral wall 2e, which has a cylindrical shape, extending from the peripheral edge of the bottom 2d.

The auxiliary member 10C in the fourth embodiment is a member having a circular frame shape, which is interposed between the first metal member 1C and second metal member 2C.

As illustrated in FIG. 10, in the butting step, the auxiliary member 10C is interposed between the end surface 1a of the first metal member 1C and the end surface 2a of the second metal member 2C to form the butted portions J1, J2.

In the joining step, substantially as in the first embodiment, only the stirring pin F2 is brought in contact with the first metal member 1C, the second metal member 2C, and the auxiliary member 10C, and friction stirring is performed, with a part of the stirring pin F2, which is continuous with the base end, exposed on the outside of the first metal member 1C and second metal member 2C. Then, as illustrated in FIG. 11, the rotary tool F is relatively moved along the auxiliary member 10C over the entire outer peripheral surfaces of the peripheral walls 1e, 2e of the first and second metal members 1C, 2C. The plasticized region W is formed in a track of the rotary tool F.

Friction-stir joining is performed on the peripheral wall 1e of the first metal member 1C and the peripheral wall 2e of the second metal member 2C so that the concave portion 1f of the first metal member 1C and the concave portion 2f of the second metal member 2C are coupled with each other. This forms a hollow container 200 in a cylinder shape, having an inner space therein defined by both the concave portions 1f, 2f.

The method for producing a hollow container according to the fourth embodiment described above also achieves substantially the same effects as the first embodiment.

Fifth Embodiment

Figure 16:
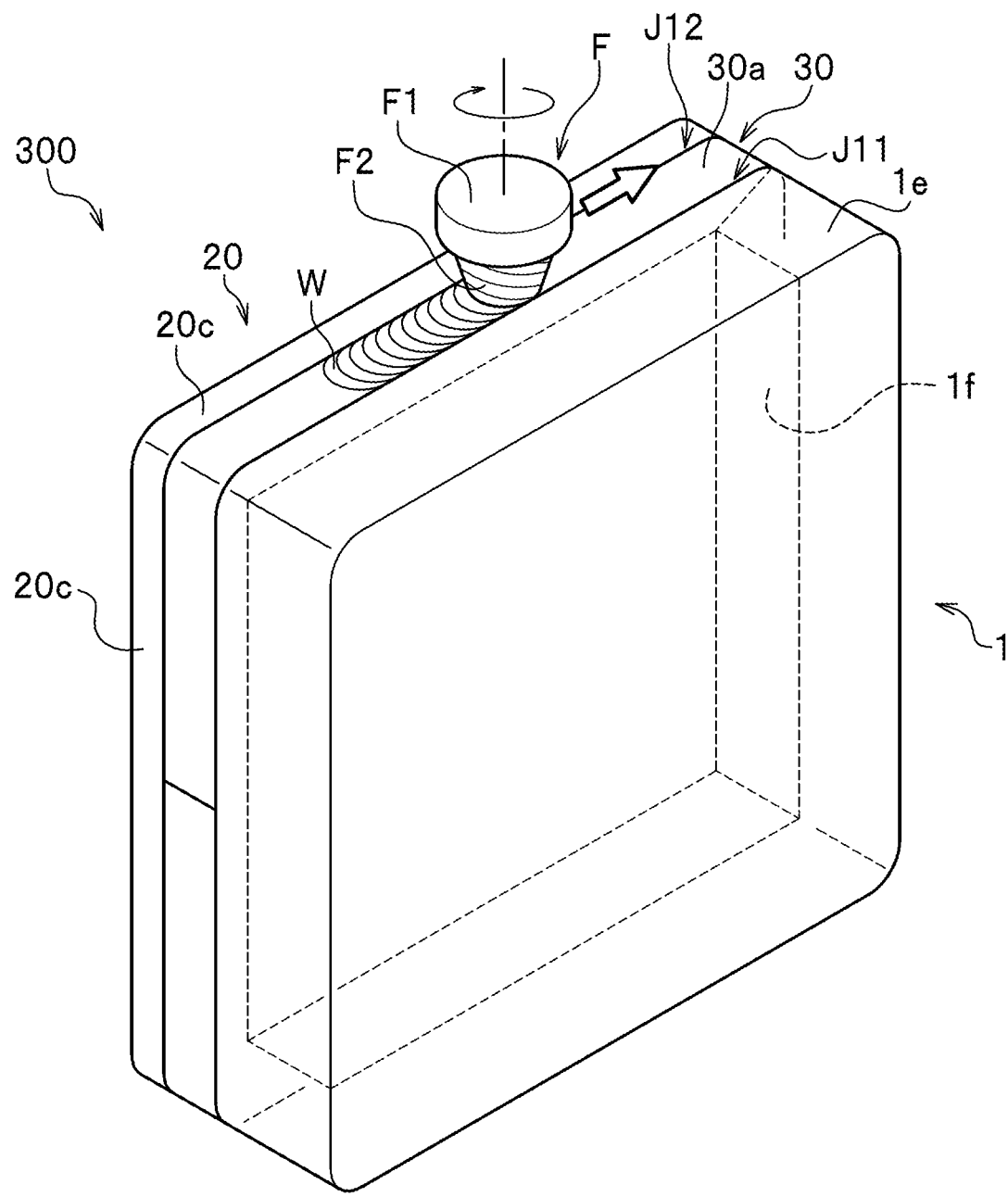
FIG. 16 is a perspective view of the components in the joining step of the method for producing a hollow container according to the fifth embodiment.

A description is given of a fifth embodiment of the present invention with reference to the drawings as appropriate. A method for producing a hollow container according to the fifth embodiment includes a preparing step, a butting step, and a joining step. As illustrated in FIG. 16, in the present embodiment, friction-stir joining is performed on the first metal member 1 and a second metal member 20 to produce a hollow container 300.

In the description below, the "outer surface" is a surface opposite to the "inner surface". Further, in the description below, the "outer peripheral surface" is a surface opposite to the "inner peripheral surface". Still further, in the description below, the "external surface" is a surface opposite to the "internal surface".

Figure 12:
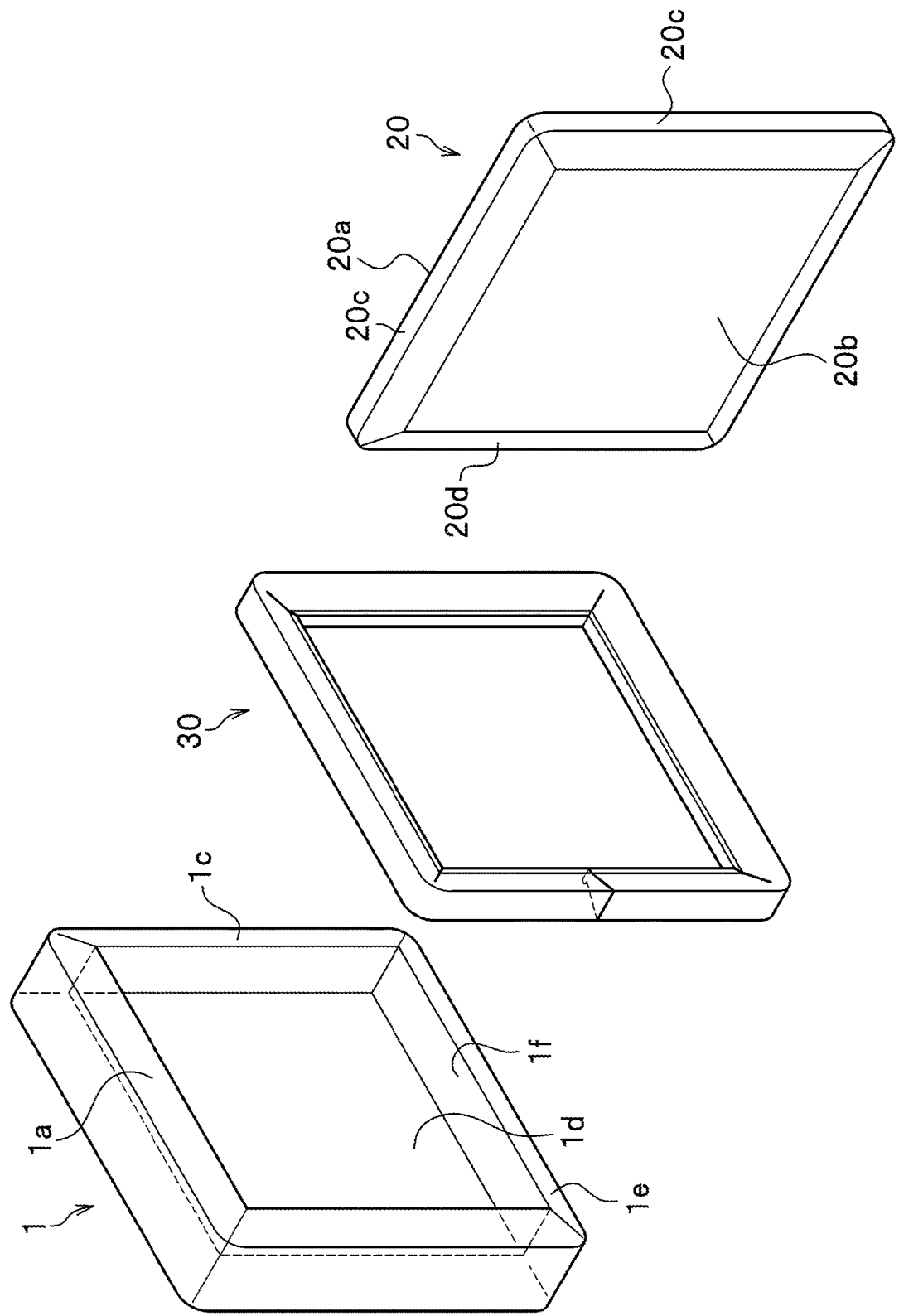
FIG. 12 is a perspective view of components in a preparing step of the method for producing a hollow container according to a fifth embodiment of the present invention.

As illustrated in FIG. 12, in the preparing step, the first metal member 1, the second metal member 20, and an auxiliary member 30 are prepared.

The first metal member 1 and second metal member 20 are metal members each having a square plate shape. The first metal member 1 and second metal member 20 are not particularly limited as long as the members are made of metals to be frictionally stirrable. For example, aluminum or an aluminum alloy may be used therefor. In the present embodiment, cast material is used for the first metal member 1 and second metal member 20, and the cast material is an aluminum alloy such as JIS H5302 ADC12 (Al—Si—Cu series alloy).

The first metal member 1 has, on a center portion of the inner surface 1c thereof, the concave portion 1f formed by the square bottom 1d and the peripheral wall 1e, which has a square tube shape and extends from the peripheral edge of the bottom 1d.

The second metal member 20 has a rectangular plate shape. The second metal member 20 has a peripheral edge 20d of an internal surface 20b inclined so as to become thinner toward an outer peripheral surface 20c. The peripheral edge 20d has an inclined surface formed over an entire periphery thereof.

Figure 14:
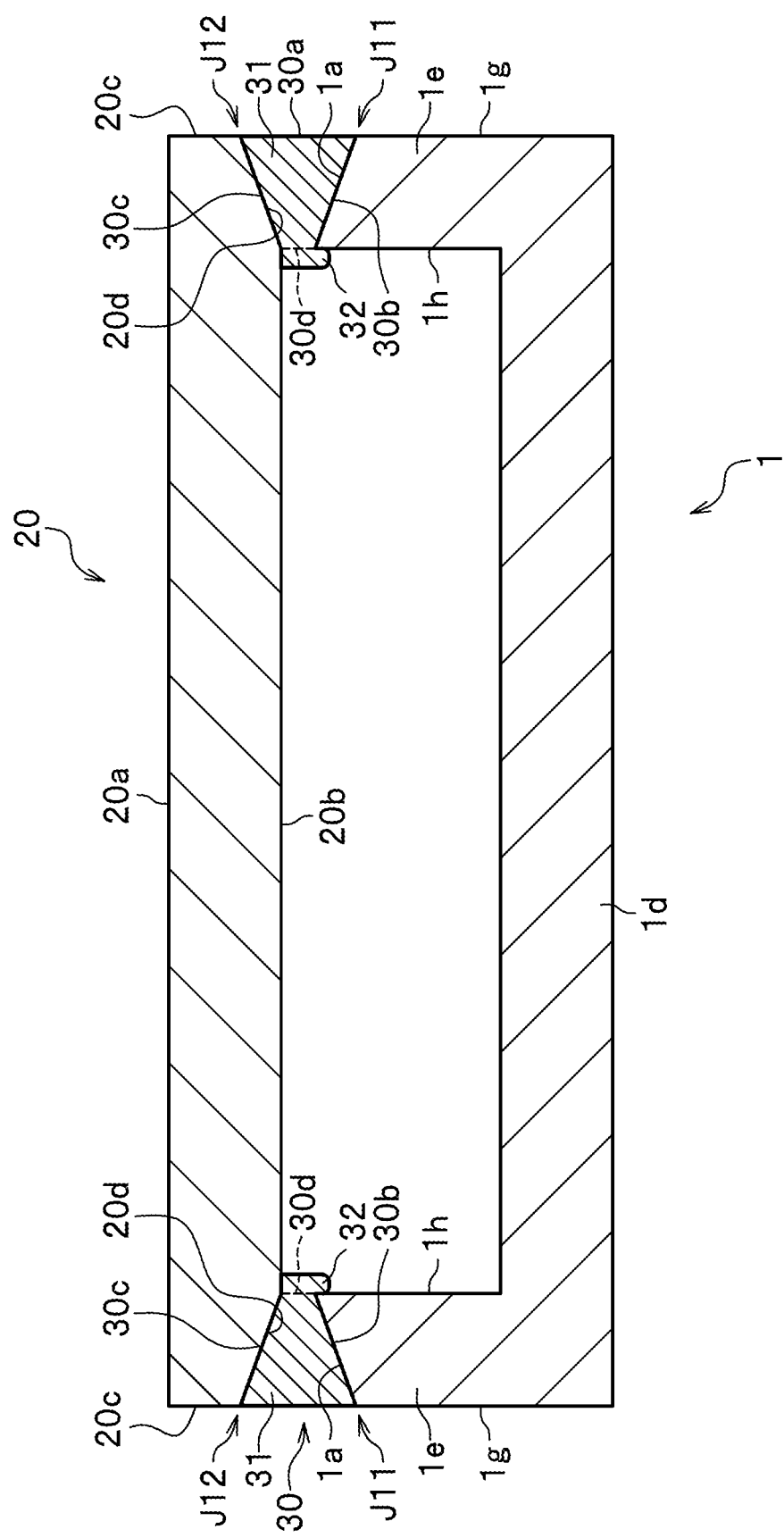
FIG. 14 is a cross-sectional view of the components in a butting step of the method for producing a hollow container according to the fifth embodiment.

As illustrated in FIG. 14, the first metal member 1 has the end surface 1a of the peripheral wall 1e inclined in a direction so as to be further away from the second metal member 20 toward the outer peripheral surface 1g. That is, the end surface 1a of the first metal member 1 and the peripheral edge 20d of the second metal member 20 are inclined so as to be further away from each other with an increasing distance from the inner peripheral surface 1h toward the outer peripheral surface 1g. Inclination angles of the end surface 1a and the peripheral edge 20d are the same as each other with respect to an imaginary orthogonal plane orthogonal to the outer peripheral surface 1g of the peripheral wall 1e.

As illustrated in FIG. 12, the auxiliary member 30 is a member having a substantially square frame shape, to be interposed between the first metal member 1 and second metal member 20. The auxiliary member 30 is made of a metal having hardness lower than the first metal member 1. The auxiliary member 30 is formed of expansile material, which is an aluminum alloy such as JIS A1050, A1100, A6063.

Figure 13:
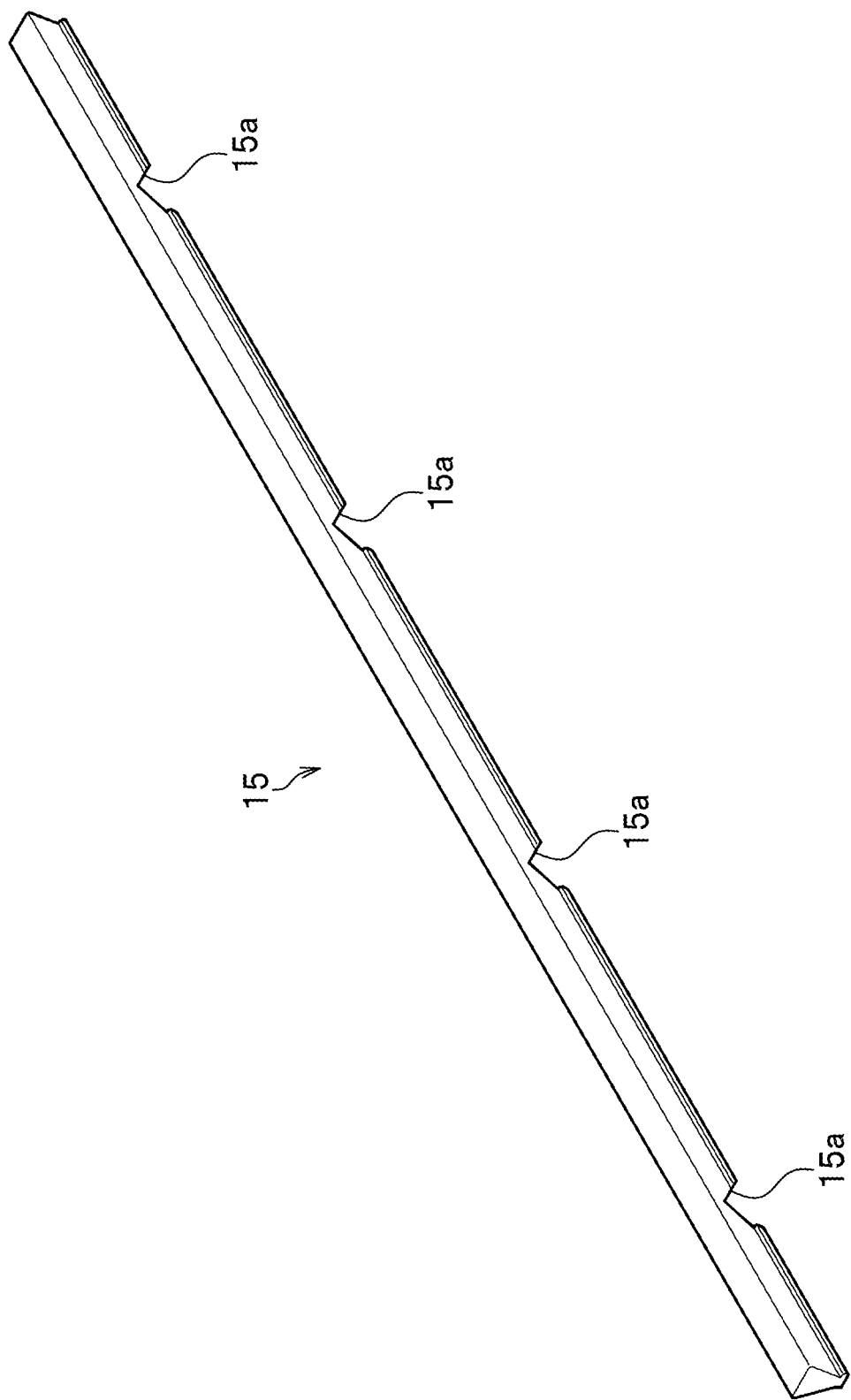
FIG. 13 is a perspective view of the auxiliary member according to the fifth embodiment, in an unprocessed state.

As illustrated in FIG. 13, the auxiliary member 30 is formed of the elongated member 15 which is an extruded member having a substantially trapezoidal shape in cross section. The elongated member 15 has the four notches 15a in a surface to form an inner periphery of the auxiliary member 30 at intervals in a longitudinal direction (see FIG. 14). The elongated member 15 is bent orthogonally at the notches 15a and both ends of the elongated member 15a are butted to form the auxiliary member 30 having a square frame shape, as illustrated in FIG. 12. Note that the auxiliary member 30 having a flame shape may be formed by die casting, for example.

As illustrated in FIG. 14, the auxiliary member 30 includes a main body 31 having a trapezoidal shape in cross section and a protrusion 32 protruding inward from an inner peripheral surface (internal surface) 30d of the main body 31.

The main body 31 includes an outer peripheral surface (external surface) 30a, side surfaces 30b and 30c, and the inner peripheral surface (internal surface) 30d. The side surfaces 30b, 30c are inclined surfaces to come closer with each other with an increasing distance from the outer peripheral surface 30a (toward the inner peripheral surface 30d). That is, the side surfaces 30b, 30c of the auxiliary member 30 are inclined surfaces which are tapered from the outer peripheral surface 30a toward the inner peripheral surface 30d. Inclination angles of the side surfaces 30b, 30c are the same as the inclination angles of the end face 1a and the peripheral edge 20d, respectively facing the side surfaces 30b, 30c.

The protrusion 32 has a rectangular shape in cross section which is wider than the inner peripheral surface (internal surface) 30d of the main body 31. The protrusion 32 is formed to have a predetermined shape in a circumferential direction of the auxiliary member 30.

As illustrated in FIG. 14, in the butting step, the first metal member 1 is butted against the second metal member 20, having the auxiliary member 30 therebetween. In the butting step, the end surface 1a of the first metal member 1 and the peripheral edge 20d of the second metal member 20 are arranged to face each other. Further, the auxiliary member 30 is interposed in a gap between the end surface 1a and the peripheral edge 20d.

The end surface 1a of the first metal member 1 is butted against the side surface 30b of the auxiliary member 30 so as to substantially surface-contact with each other, to form a butted portion J11. The peripheral edge 20d of the second metal member 20 is butted against the side surface 30c of the auxiliary member 30 so as to substantially surface-contact with each other, to form a butted portion J12. The outer peripheral surface (external surface) 30a of the auxiliary member 30 is flush with the outer peripheral surface 1g of the first metal member 1 and an outer peripheral surface 20c of the second metal member 20. The inner peripheral surface 30d of the auxiliary member 30 is flush with the inner peripheral surface 1h of the first metal member 1. Further, the protrusion 32 is locked to the inner peripheral surface 1h of the first metal member 1.

Figure 15:
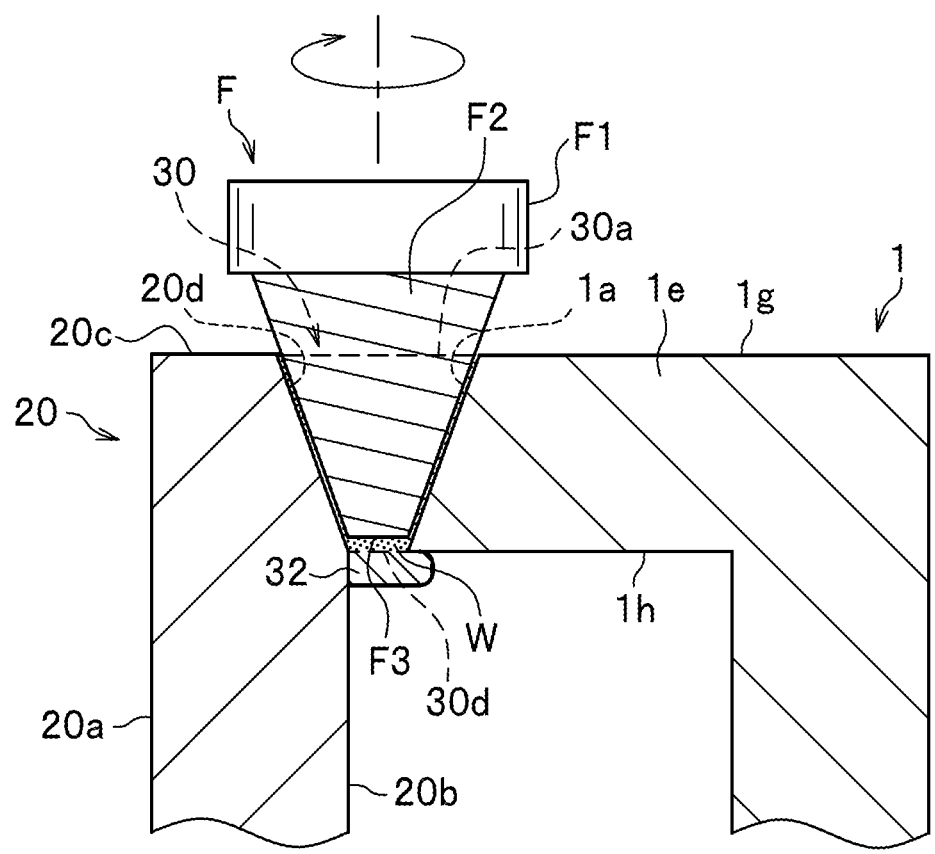
FIG. 15 is a cross-sectional view of the components in a joining step of the method for producing a hollow container according to the fifth embodiment.

As illustrated in FIG. 15, the rotary tool F includes the base F1 and the stirring pin F2. The rotary tool F is made of tool steel, for example. The base F1 is a portion connected to the rotation shaft of the friction stirring device. The stirring pin F2 extends downward from the base F1 to have a tapered shape. The stirring pin F2 has, at the tip thereof, the flat surface F3 perpendicular to a central axis for rotation. The flat surface F3 is formed to have a size slightly larger than the inner peripheral surface 30d of the auxiliary member 30.

A taper angle of the outer peripheral surface of the stirring pin F2 is the same as each of the inclination angles of the end surface 1a of the first metal member 1 and the peripheral edge 20d of the second metal member 20. That is, a cross-sectional shape of the stirring pin F2 in a lateral view is substantially the same as a cross-sectional shape of the main body 31 of the auxiliary member 30.

The spiral groove is formed in the outer peripheral surface of the stirring pin F2. In the present embodiment, the rotary tool F is rotated clockwise so that the spiral groove is formed counterclockwise from the base end toward the tip. Note that, in a case where the rotary tool F is rotated counterclockwise, a spiral groove is formed clockwise from the base end toward the tip. Accordingly, plastically fluidized metal is guided by the spiral groove to move toward the tip, which prevents generation of burrs. The rotary tool F may be attached to an arm robot including a rotation driver at a tip thereof, for example.

As illustrated in FIG. 15, in the joining step, friction-stir joining is performed on the first metal member 1 and second metal member 20, with use of the rotary tool F. In the joining step, the stirring pin F2 of the rotary tool F being rotated clockwise is inserted into the center in a width direction of the outer peripheral surface (external surface) 30a of the auxiliary member 30.

In the joining step, the outer peripheral surface of the stirring pin F2 may not necessarily be brought in contact with the end surface 1a of the first metal member 1 and the peripheral edge 20d of the second metal member 20. In the present embodiment, the stirring pin F2 is relatively moved along the auxiliary member 30, with the outer peripheral surface of the stirring pin F2 being slightly in contact with both the end surface 1a and the peripheral edge 20d. A contact margin between the outer peripheral surface of the stirring pin F2, and the end surface 1a and the peripheral edge 20d may be appropriately set to be less than 1.0 mm, for example.

In the joining step, only the stirring pin F2 is brought in contact with the first metal member 1, the second metal member 20, and the auxiliary member 30, and friction stirring is performed, with a part of the stirring pin F2, which is continuous with the base end, exposed on the outside of the first metal member 1 and second metal member 20. The flat surface F3 of the stirring pin F2 is inserted to a deep position as far as the flat surface F3 does not protrude from the inner peripheral surface 1h of the first metal member 1.

As illustrated in FIG. 16, the rotary tool F is relatively moved along the auxiliary member 30 over an entire peripheral wall 1e of the first metal member 1 and the outer peripheral surface 20c of the second metal member 20, to overlap a start position with an end position. When reaching the end position, the rotary tool F is removed from the auxiliary member 30. Thus, friction-stir joining is performed on the butted portions J11, J12 simultaneously in one step. The plasticized region W is formed in the track of the rotary tool F.

Friction-stir joining is performed on the peripheral wall 1e of the first metal member 1 and the second metal member 20, and this forms the hollow container 300, having an inner space therein defined by the concave portion 1f.

According to the method for producing the hollow container 300 of the present embodiment described above, the rotary tool F including the tapered stirring pin F2 is used as illustrated in FIG. 15 to facilitate inserting the stirring pin F2 into the outer peripheral surface (external surface) 30a of the auxiliary member 30. Further, only the stirring pin F2 is inserted into the auxiliary member 30 and friction stirring is performed with a part of the stirring pin F2, which is continuous with the base end, exposed, so that a load reacting on the friction stirring device is reduced.

Further, the rotary tool F is inserted into the auxiliary member 30 which is softer than the first metal member 1 and second metal member 20, so that a service life of the rotary tool F is prolonged. Still further, the stirring pin F2 is only slightly brought in contact with the first metal member 1 and the second metal member 20, so that a large amount of hard metal forming the first metal member 1 and second metal member 20 is prevented from being mixed into the auxiliary member 30. Therefore, joint strength is further increased.

Further, the end surface 1a of the first metal member 1 and the peripheral edge 20d of the second metal member 20 are formed into inclined surfaces, so that the stirring pin F2 is prevented from greatly coming in contact with the first metal member 1 and second metal member 20. Still further, in the present embodiment, the taper angle of the stirring pin F2 is substantially the same as (substantially in parallel with) the inclination angles of the of the end surface 1a and the peripheral edge 20d so that friction stirring is performed in a well-balanced manner end-to-end in a height direction.

Further, when a length of material to be joined by friction-stir joining is long, the auxiliary member 30 is also formed long, accordingly. In such a case, friction-stir joining may result in the auxiliary member 30 coming off. However, according to the present embodiment, the auxiliary member 30 includes the protrusion 32 which is locked to the inner peripheral surface 1h of the peripheral wall 1e so that the auxiliary member 30 is prevented from coming off. Accordingly, the auxiliary member 30 is prevented from being displaced with respect to the first metal member 1 and second metal member 20, so that friction-stir joining is performed more suitably.

Sixth Embodiment

Figure 17:
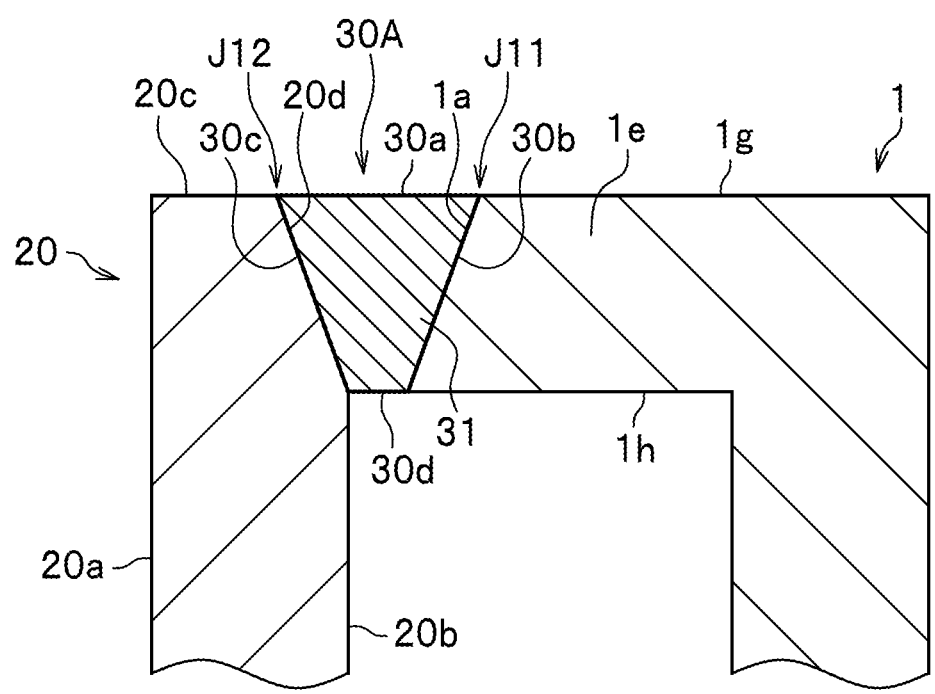
FIG. 17 is a cross-sectional view of components in a butting step of the method for producing a hollow container according to a sixth embodiment of the present invention.

Next, a description is given of a method for producing a hollow container according to a sixth embodiment of the present invention. FIG. 17 is a cross-sectional view of components in a butting step of the method for producing a hollow container according to the sixth embodiment of the present invention.

The method for producing a hollow container of the sixth embodiment includes a preparing step, the butting step, and a joining step. The sixth embodiment mainly differs from the first embodiment on the point that an auxiliary member 30A has a different shape. In the present embodiment, the description is focused on difference from the fifth embodiment.

As illustrated in FIG. 17, the first metal member 1 and second metal member 20 are the same as those in the fifth embodiment. The auxiliary member 30A includes the main body 31 having a trapezoidal shape in cross section. That is, the auxiliary member 30A of the sixth embodiment is configured without the protrusion 32 of the auxiliary member 30 (see FIG. 14) of the fifth embodiment.

In the butting step, as in the fifth embodiment, the first metal member 1 and the second metal member 2 are butted against the auxiliary member 30A from both sides. The end surface 1a of the first metal member 1 is butted against the side surface 30b of the auxiliary member 30 to form the butted portion J11. The peripheral edge 20d of the second metal member 20 is butted against the side surface 30c of the auxiliary member 30 to form the butted portion J12.

In the joining step, friction-stir joining is performed on the butted portions J11, J12 with use of the rotary tool F, as in the fifth embodiment.

The sixth embodiment described above achieves substantially the same effects as the fifth embodiment. Further, the auxiliary member 30A of the sixth embodiment has a trapezoidal shape in cross section, so that the auxiliary member 30A is easily made by extruded protrusion.

Seventh Embodiment

Figure 18:
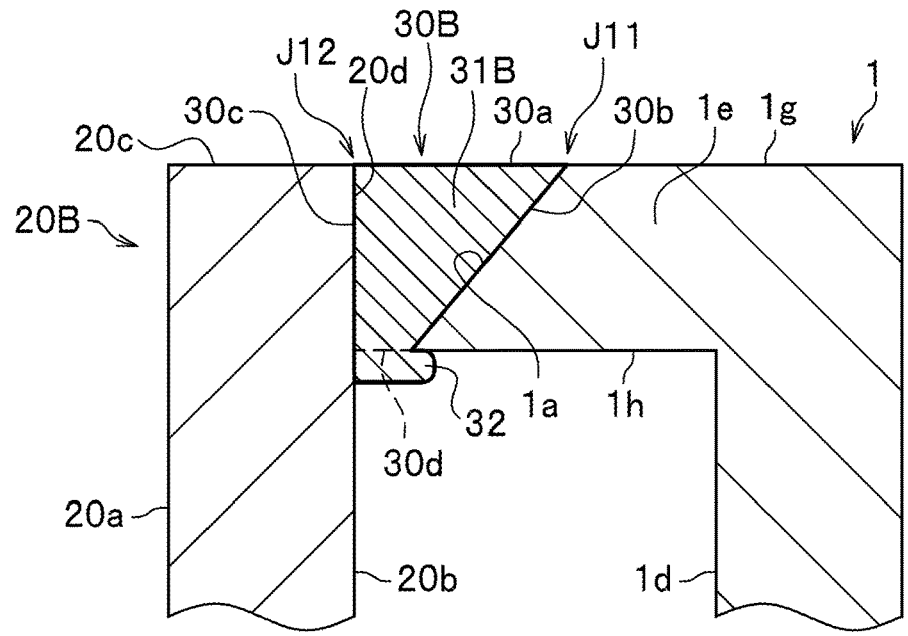
FIG. 18 is a cross-sectional view of components in a butting step of the method for producing a hollow container according to a seventh embodiment of the present invention.
Figure 19:
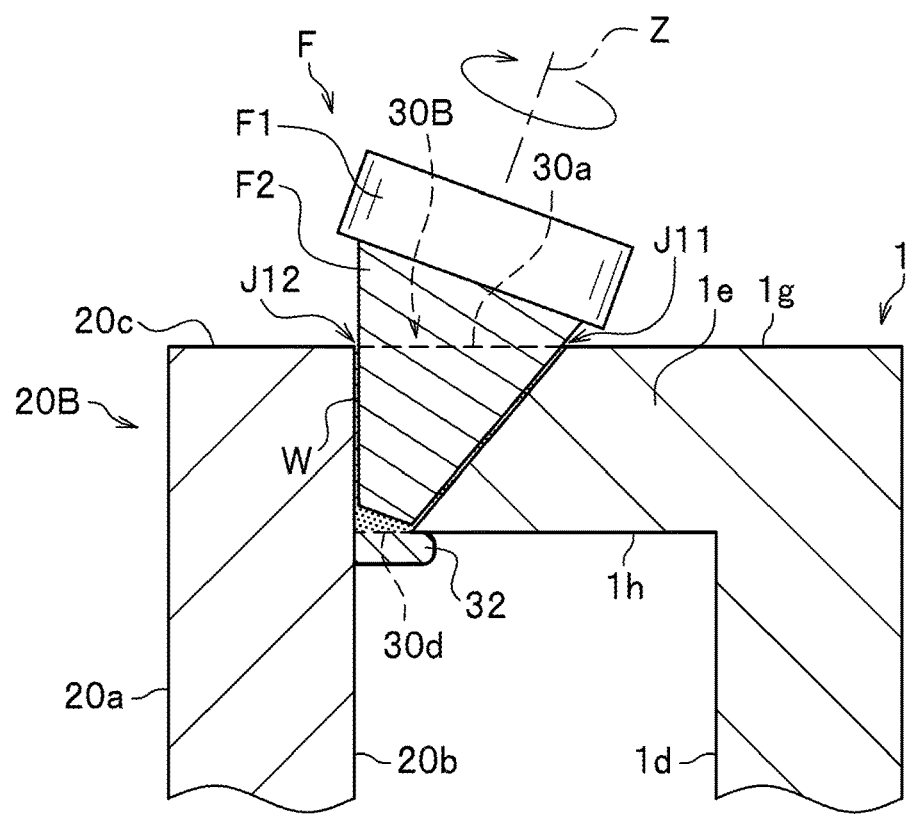
FIG. 19 is a cross-sectional view of the components in a joining step of the method for producing a hollow container according to the seventh embodiment.

Next, a description is given of a method for producing a hollow container according to a seventh embodiment of the present invention. FIG. 18 is a cross-sectional view of components in a butting step of the method for producing a hollow container according to the seventh embodiment of the present invention. FIG. 19 is a cross-sectional view of the components in a joining step of the method for producing a hollow container according to the seventh embodiment of the present invention.

The method for producing a hollow container according to the seventh embodiment includes a preparing step, the butting step, and the joining step. The seventh embodiment mainly differs from the fifth embodiment on the point that an auxiliary member 30B has a different shape. In the present embodiment, the description is focused on difference from the fifth embodiment.

As illustrated in FIG. 18, in the preparing step, the first metal member 1, a second metal member 20B, and the auxiliary member 30B are prepared. The first metal member 1 is substantially the same as that in the fifth embodiment. The second metal member 20B does not have any inclined surface formed at the peripheral edge 20d of the internal surface 20b.

The auxiliary member 30B of the seventh embodiment includes a main body 31B having a trapezoidal shape in cross section and the protrusion 32 protruding from the inner peripheral surface 30d of the main body 31B.

The main body 31B has the outer peripheral surface (external surface) 30a, the side surfaces 30b, 30c, and the inner peripheral surface (internal surface) 30d. The side surface 30c is perpendicular to the outer peripheral surface 30a. The side surface 30b is inclined to taper with an increasing distance from the outer peripheral surface 30a. An inclination angle of the side surface 30c is the same as that of the end surface 1a of the first metal member 1. The protrusion 32 is substantially the same as that in the fifth embodiment.

In the butting step, the first metal member 1 and second metal member 20B are butted against the auxiliary member 30B. The end surface 1a of the first metal member 1 is butted against the side surface 30b of the auxiliary member 30B to form the butted portion J11. The peripheral edge 20d of the second metal member 20B is butted against the side surface 30c of the auxiliary member 30B to form the butted portion J12. The outer peripheral surface (external surface) 30a of the auxiliary member 30B is flush with the outer peripheral surface 1g of the first metal member 1 and the outer peripheral surface 20c of the second metal member 20B. The inner peripheral surface (internal surface) 30d of the auxiliary member 30B is flush with the inner peripheral surface 1h of the first metal member 1.

As illustrated in FIG. 19, in the joining step, friction-stir joining is performed with use of the rotary tool F. In the seventh embodiment, only the stirring pin F2 of the rotary tool F is inserted into the auxiliary member 30B and is relatively moved along the auxiliary member 30B, with a part of the stirring pin F2, which is continuous with the base end, exposed, to perform friction-stir joining on the butted portions J11, J12.

Further, in the seventh embodiment, friction stirring is performed, with the outer peripheral surface of the stirring pin F2 being slightly in contact with the end surface 1a of the first metal member 1 and the peripheral edge 20d of the second metal member 20B while the central axis for rotation Z of the stirring pin F2 being inclined toward the bottom 1d of the first metal member 1.

Note that the inclination angle of the rotary tool F may be set appropriately, and is preferably set such that the outer peripheral surface of the stirring pin F2 is in parallel with the end surface 1a of the first metal member 1 and the peripheral edge 20d of the second metal member 20B.

The method for producing a hollow container according to the seventh embodiment described above also achieves substantially the same effects as the fifth embodiment. Further, in the seventh embodiment, the peripheral edge 20d of the second metal member 20B is not required to be an inclined surface, resulted in reduction in time and labor. Note that the protrusion 32 may be omitted.

Eighth Embodiment

Figure 20:
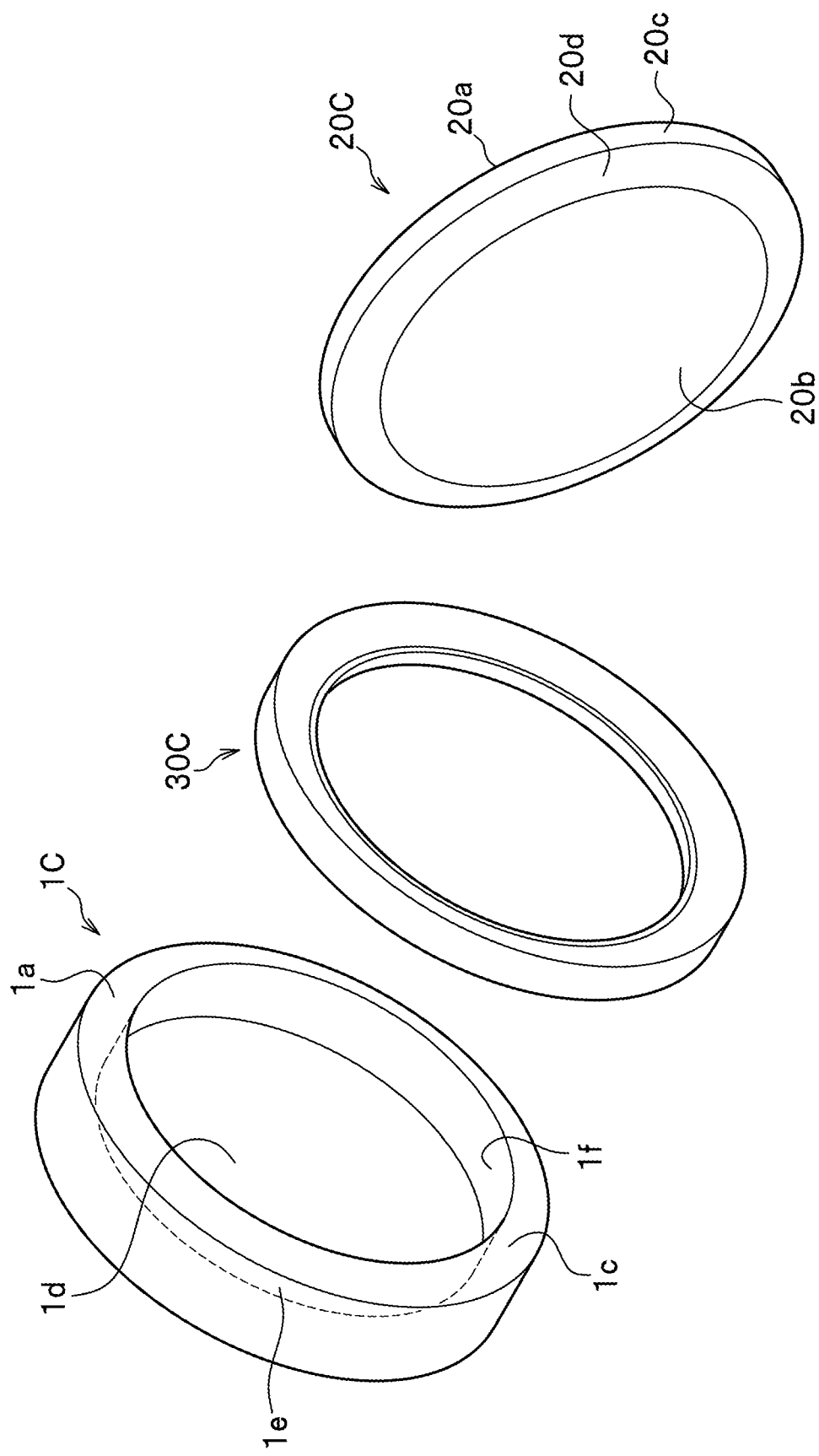
FIG. 20 is a perspective view of components in a preparing step of the method for producing a hollow container according to an eighth embodiment of the present invention.
Figure 21:
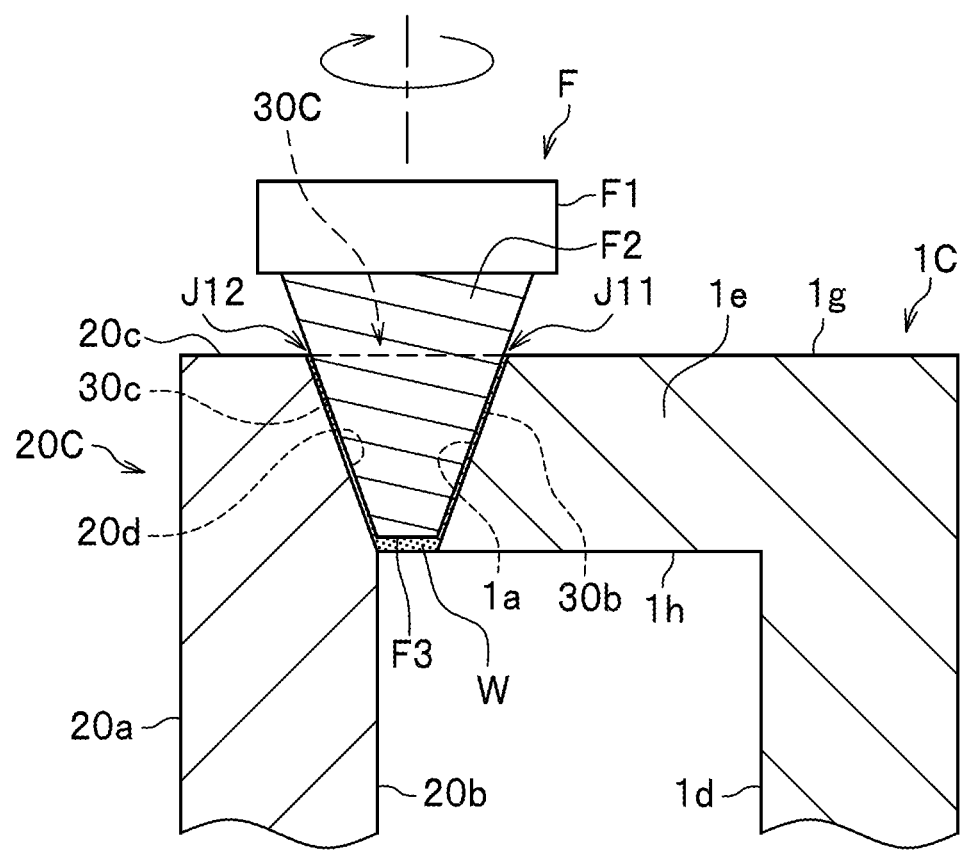
FIG. 21 is a cross-sectional view of the components in a joining step of the method for producing a hollow container according to the eighth embodiment.
Figure 22:
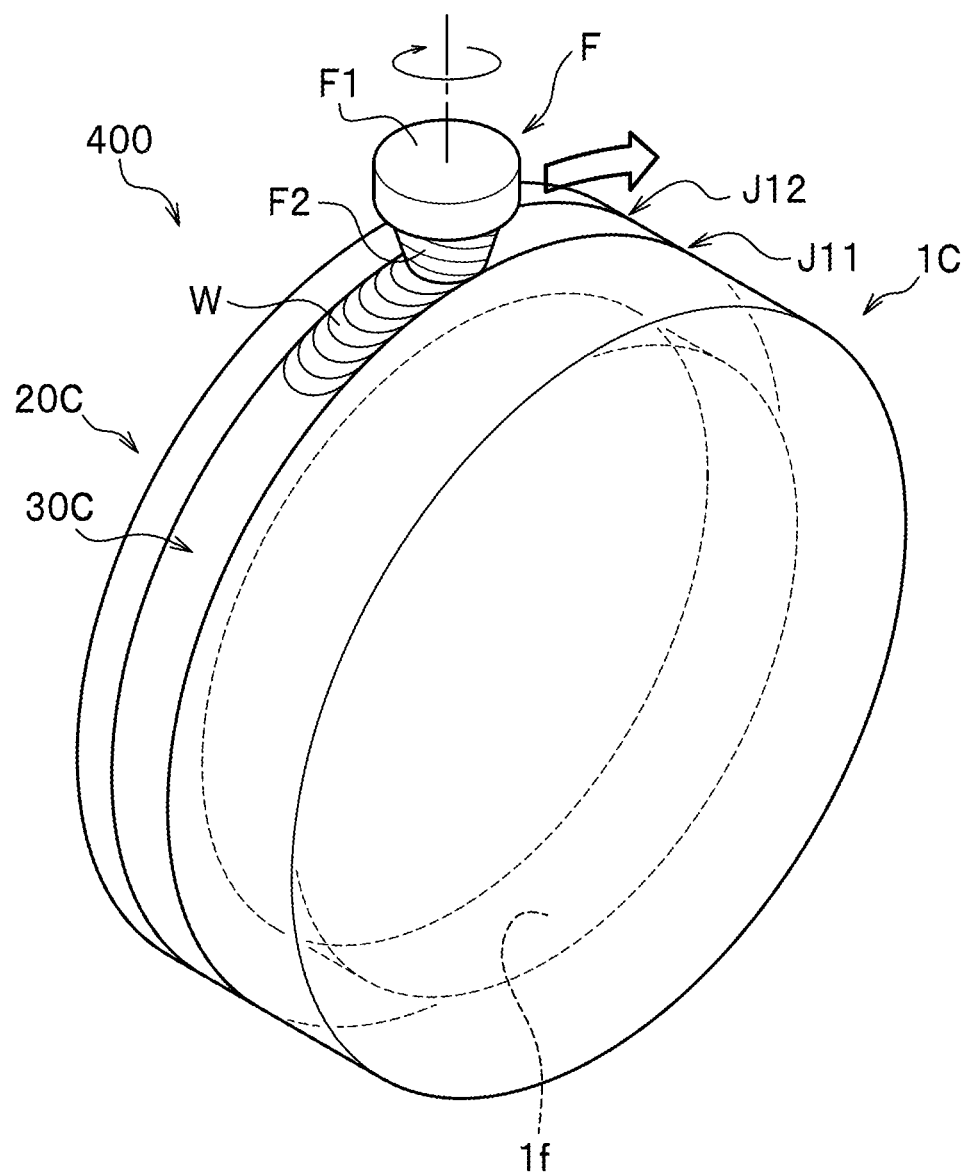
FIG. 22 is a perspective view of the components in the joining step of the method for producing a hollow container according to the eighth embodiment.

Next, a description is given of a method for producing a hollow container according to an eighth embodiment of the present invention. FIG. 20 is a perspective view of components in a preparing step of the method for producing a hollow container according to the eighth embodiment of the present invention. FIG. 21 is a cross-sectional view of the components in a joining step of the method for producing a hollow container according to the eighth embodiment. FIG. 22 is a perspective view of the components in the joining step of the method for producing a hollow container according to the eighth embodiment.

The method for producing a hollow container according to the eighth embodiment includes the preparing step, the butting step, and the joining step. The eighth embodiment mainly differs from the fifth embodiment on the point that the first metal member 1C, a second metal member 20C, and an auxiliary member 30C have different shapes. In the present embodiment, the description is focused on difference from the fifth embodiment.

The method for producing a hollow container according to the eighth embodiment includes the preparing step, the butting step, and the joining step. The eighth embodiment mainly differs from the fifth embodiment on the point that the first metal member 1C, a second metal member 20C, and an auxiliary member 30C have different shapes. In the present embodiment, the description is focused on difference from the fifth embodiment.

As illustrated in FIG. 20, the first metal member 1C in the eighth embodiment has, on a center portion of the inner surface 1c thereof, the concave portion 1f formed by the bottom 1d in a circular shape and the peripheral wall 1e, which has a cylindrical shape, extending from the peripheral edge of the bottom 1d.

The second metal member 20C of the eighth embodiment has a circular-plate shape. The peripheral edge 20d of the internal surface 20b of the second metal member 20C is inclined so as to become thinner toward the outer peripheral surface 20c. The peripheral edge 20d has an inclined surface formed over an entire periphery thereof.

The auxiliary member 30C in the eighth embodiment is a member having a circular frame shape, which is interposed between the first metal member 1C and second metal member 20C. The auxiliary member 30C has a trapezoidal shape, tapered inward, in cross section.

As illustrated in FIG. 21, in the butting step, the auxiliary member 30C is interposed between the end surface 1a of the first metal member 1C and the peripheral edge 20d of the second metal member 20C to form the butted portions J1, J2. The butted portion J11 is a portion where the end surface 1a of the first metal member 1C is butted against the side surface 30b of the auxiliary member 30C. The butted portion J12 is a portion where the peripheral edge 20d of the second metal member 20C is butted against the side surface 30c of the auxiliary member 30C.

In the joining step, substantially as in the fifth embodiment, only the stirring pin F2 is brought in contact with the first metal member 1C, the second metal member 20C, and the auxiliary member 30C, and friction stirring is performed with a part of the stirring pin F2, which is continuous with the base end, exposed on the outside of the first metal member 1C and second metal member 20C. Then, as illustrated in FIG. 22, the rotary tool F is relatively moved along the auxiliary member 30C over the entire outer peripheral surfaces of the first metal member 1C and second metal member 20C. The plasticized region W is formed in a track of the rotary tool F.

Friction-stir joining is performed on the peripheral wall 1e of the first metal member 1C and the peripheral edge 20d of the second metal member 20C, and this forms a cylindrical hollow container 400 having an inner space formed by the concave portion 1f.

The method for producing a hollow container according to the eighth embodiment described above also achieves substantially the same effects as the fifth embodiment.

EXPLANATION OF REFERENCE SYMBOLS

1: first metal member (first embodiment, seventh embodiment); 1B: first metal member (third embodiment); 1C: first metal member (fourth embodiment, eighth embodiment); 1a: end surface (inclined surface); 2: second metal member; 2C: second metal member (fourth embodiment); 2a: end surface (inclined surface); 10: auxiliary member; 10*a*: outer peripheral surface (external surface); 10*b*: inner peripheral surface (internal surface); 10A: auxiliary member (second embodiment); 10B: auxiliary member (third embodiment); 10C: auxiliary member (fourth embodiment); 12: protrusion; 20: second metal member (fifth embodiment); 20*b*: internal surface; 20*d*: peripheral edge; 30: auxiliary member (fifth embodiment); 30A: auxiliary member (sixth embodiment); 30B: auxiliary member (seventh embodiment); 30C: auxiliary member (eighth embodiment); 32: protrusion; J1: butted portion; J2: butted portion; J11: butted portion; J12: butted portion; F: rotary tool; F2: stirring pin

What is claimed is:

1. A method for manufacturing a hollow container with use of a rotary tool including a tapered stirring pin, the method comprising:
   preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame structure corresponding to an end surface of the peripheral wall of the first metal member and an end surface of the peripheral wall of the second metal member;
   butting, in which the end surface of the peripheral wall of the first metal member and the end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and
   joining, in which the rotating rotary tool is inserted only through an external surface of the auxiliary member and is relatively moved along the first butted portion and the second butted portion, with only the stirring pin contacting the auxiliary member and an outer peripheral surface of the stirring pin contacting the first and second metal members, to join the first metal member to the second metal member via the auxiliary member with a contact margin between the outer peripheral surface of the stirring pin and the end surfaces set to be less than 1.0 mm,
   wherein the first metal member, the second metal member, and the auxiliary member are made of aluminum or an aluminum alloy, and the first metal member and the second metal member have higher hardness than the auxiliary member, and
   the end surface of the peripheral wall of at least one of the first metal member and the second metal member has an inclined surface to face outward, and the auxiliary member has an inclined surface, which is tapered from the external surface toward an internal surface, on at least one of the side surfaces.

2. The method for manufacturing a hollow container as claimed in claim 1, wherein, in the joining step, the rotary tool is moved over an entire outer peripheral surfaces of the first metal member and the second metal member.

3. The method for manufacturing a hollow container as claimed in claim 1, wherein the first metal member and the second metal member are made of a casting material, and the auxiliary member is made of an wrought aluminum alloy material.

4. A method for manufacturing a hollow container with use of a rotary tool including a tapered stirring pin, the method comprising:
   preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame structure corresponding to an end surface of the peripheral wall of the first metal member and an end surface of the peripheral wall of the second metal member;
   butting, in which the end surface of the peripheral wall of the first metal member and the end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and
   joining, in which the rotating rotary tool is inserted only through an external surface of the auxiliary member and is relatively moved along the first butted portion and the second butted portion, with only the stirring pin contacting the auxiliary member and an outer peripheral surface of the stirring pin contacting the first and second metal members, to join the first metal member to the second metal member via the auxiliary member with a contact margin between the outer peripheral surface of the stirring pin and the end surfaces set to be less than 1.0 mm,
   wherein the first metal member, the second metal member, and the auxiliary member are made of aluminum or an aluminum alloy, and the first metal member and the second metal member have higher hardness than the auxiliary member, and
   the end surfaces of the peripheral walls of the first metal member and the second metal member have inclined surfaces to face outward, and the auxiliary member has inclined surfaces, which are tapered from the external surface toward an internal surface, on both of the side surfaces.

5. The method for manufacturing a hollow container as claimed in claim 4, wherein, in the joining step, the rotary tool is moved over an entire outer peripheral surfaces of the first metal member and the second metal member.

6. The method for manufacturing a hollow container as claimed in claim 4, wherein the first metal member and the second metal member are made of a casting material, and the auxiliary member is made of an wrought aluminum alloy material.

7. A method for manufacturing a hollow container with use of a rotary tool including a tapered stirring pin, the method comprising:
   preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame structure corresponding to an end surface of the peripheral wall of the first metal member and an end surface of the peripheral wall of the second metal member;

butting, in which the end surface of the peripheral wall of the first metal member and the end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin contacting the first and second metal members, to join the first metal member to the second metal member via the auxiliary member with a contact margin between the outer peripheral surface of the stirring pin and the end surfaces set to be less than 1.0 mm, wherein the first metal member, the second metal member, and the auxiliary member are made of aluminum or an aluminum alloy, and the first metal member and the second metal member have higher hardness than the auxiliary member, the end surface of the peripheral wall of at least one of the first metal member and the second metal member has an inclined surface to face outward, and the auxiliary member has an inclined surface, which is tapered from the external surface toward an internal surface, on at least one of the side surfaces, and has a protrusion, which extends on at least one of the side surfaces side, on the internal surface.

8. The method for manufacturing a hollow container as claimed in 7, wherein, in the joining step, the rotary tool is moved over an entire outer peripheral surfaces of the first metal member and the second metal member.

9. The method for manufacturing a hollow container as claimed in 7, wherein the first metal member and the second metal member are made of a casting material, and the auxiliary member is made of an wrought aluminum alloy material.

10. A method for manufacturing a hollow container with use of a rotary tool including a tapered stirring pin, the method comprising:

preparing a first metal member having a concave portion which is formed by a bottom and a peripheral wall extending from a peripheral edge of the bottom, a second metal member having a concave portion which is formed by a bottom and a peripheral wall extending from a peripheral edge of the bottom, and an auxiliary member having a frame structure corresponding to an end surface of the peripheral wall of the first metal member and an end surface of the peripheral wall of the second metal member;

butting, in which the end surface of the peripheral wall of the first metal member and the end surface of the peripheral wall of the second metal member are faced with each other, the auxiliary member is interposed in a gap between the end surfaces, the end surface of the peripheral wall of the first metal member is butted against one side surface of the auxiliary member to form a first butted portion, and the end surface of the peripheral wall of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin contacting the first and second metal members, to join the first metal member to the second metal member via the auxiliary member with a contact margin between the outer peripheral surface of the stirring pin and the end surfaces set to be less than 1.0 mm, wherein the first metal member, the second metal member, and the auxiliary member are made of aluminum or an aluminum alloy, and the first metal member and the second metal member have higher hardness than the auxiliary member, the end surfaces of the peripheral walls of the first metal member and the second metal member have inclined surfaces to face outward, and the auxiliary member has inclined surfaces, which are tapered from the external surface toward an internal surface, on both of the side surfaces, and has a protrusion, which extends on at least one of the side surfaces side, on the internal surface.

11. The method for manufacturing a hollow container as claimed in claim 10, wherein, in the joining step, the rotary tool is moved over an entire outer peripheral surfaces of the first metal member and the second metal member.

12. The method for manufacturing a hollow container as claimed in claim 10, wherein the first metal member and the second metal member are made of a casting material, and the auxiliary member is made of an wrought aluminum alloy material.

13. A method for manufacturing a hollow container with use of a rotary tool including a tapered stirring pin, the method comprising:

preparing a first metal member having a concave portion which is formed by a bottom and a peripheral wall extending from a peripheral edge of the bottom, a second metal member having a plate shape, and an auxiliary member having a frame structure corresponding to an end surface of the peripheral wall of the first metal member and a peripheral edge on an internal surface of the second metal member;

butting, in which the end surface of the peripheral wall of the first metal member and the peripheral edge on the internal surface of the second metal member are faced with each other, the auxiliary member is interposed in a gap between the end surface and the peripheral edge, the end surface of the peripheral wall of the first metal member is butted against one side surface of the auxiliary member to form a first butted portion, and the peripheral edge on the internal surface of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin contacting the first and second metal members, to join the first metal member
to the second metal member via the auxiliary member
with a contact margin between the outer peripheral
surface of the stirring pin and the end surfaces set to be
less than 1.0 mm,
wherein the first metal member, the second metal member, and the auxiliary member are made of aluminum or
an aluminum alloy, and the first metal member and the
second metal member have higher hardness than the
auxiliary member, and
at least one of the end surface of the peripheral wall of the
first metal member and the peripheral edge on the
internal surface of the second metal member has an
inclined surface to face outward, and the auxiliary
member has an inclined surface, which is tapered from
the external surface toward an internal surface, on at
least one of the side surfaces.

14. The method for manufacturing a hollow container as claimed in claim 13, wherein, in the joining step, the rotary tool is moved over around the first metal member and the second metal member.

15. The method for manufacturing a hollow container as claimed in claim 13, wherein the first metal member and the second metal member are made of a casting material, and the auxiliary member is made of an wrought aluminum alloy material.

16. A method for manufacturing a hollow container with use of a rotary tool including a tapered stirring pin,
the method comprising:
preparing a first metal member having a concave portion
which is formed by a bottom and a peripheral wall
extending from a peripheral edge of the bottom, a
second metal member having a plate shape, and an
auxiliary member having a frame structure corresponding to an end surface of the peripheral wall portion of
the first metal member and a peripheral edge on an
internal surface of the second metal member;
butting, in which the end surface of the peripheral wall of
the first metal member and the peripheral edge on the
internal surface of the second metal member are faced
with each other, the auxiliary member is interposed in
a gap between the end surface and the peripheral edge,
the end surface of the peripheral wall of the first metal
member is butted against one side surface of the
auxiliary member to form a first butted portion, and the
peripheral edge on the internal surface of the second
metal member is butted against the other side surface of
the auxiliary member to form a second butted portion;
and
joining, in which the rotating rotary tool is inserted only
through an external surface of the auxiliary member
and relatively moved along the first butted portion and
the second butted portion, with only the stirring pin
contacting the auxiliary member and an outer peripheral surface of the stirring pin contacting the first and
second metal members, to join the first metal member
to the second metal member via the auxiliary member
with a contact margin between the outer peripheral
surface of the stirring pin and the end surfaces set to be
less than 1.0 mm,
wherein the first metal member, the second metal member, and the auxiliary member are made of aluminum or
an aluminum alloy, and the first metal member and the
second metal member have higher hardness than the
auxiliary member, and
the end surface of the peripheral wall of the first metal
member and the peripheral edge on the internal surface
of the second metal member have inclined surfaces to
face outward, and the auxiliary member has inclined
surfaces, which are tapered from the external surface
toward an internal surface, on both of the side surfaces.

17. The method for manufacturing a hollow container as claimed in 16, wherein, in the joining step, the rotary tool is moved over around the first metal member and the second metal member.

18. The method for manufacturing a hollow container as claimed in claim 16, wherein the first metal member and the second metal member are made of a casting material, and the auxiliary member is made of an wrought aluminum alloy material.

19. A method for manufacturing a hollow container with use of a rotary tool including a tapered stirring pin,
the method comprising:
preparing a first metal member having a concave portion
which is formed by a bottom and a peripheral wall
extending from a peripheral edge of the bottom, a
second metal member having a plate shape, and an
auxiliary member having a frame structure corresponding to an end surface of the peripheral wall of the first
metal member and a peripheral edge on an internal
surface of the second metal member;
butting, in which the end surface of the peripheral wall of
the first metal member and the peripheral edge on the
internal surface of the second metal member are faced
with each other, the auxiliary member is interposed in
a gap between the end surface and the peripheral edge,
the end surface of the peripheral wall of the first metal
member is butted against one side surface of the
auxiliary member to form a first butted portion, and the
peripheral edge on the internal surface of the second
metal member is butted against the other side surface of
the auxiliary member to form a second butted portion;
and
joining, in which the rotating rotary tool is inserted only
through an external surface of the auxiliary member
and is relatively moved along the first butted portion
and the second butted portion, with only the stirring pin
contacting the auxiliary member and an outer peripheral surface of the stirring pin contacting the first and
second metal members, to join the first metal member
to the second metal member via the auxiliary member
with a contact margin between the outer peripheral
surface of the stirring pin and the end surfaces set to be
less than 1.0 mm,
wherein the first metal member, the second metal member, and the auxiliary member are made of aluminum or
an aluminum alloy, and the first metal member and the
second metal member have higher hardness than the
auxiliary member, and
at least one of the end surface of the peripheral wall of the
first metal member and the peripheral edge on the
internal surface of the second metal member has an
inclined surface to face outward, and the auxiliary
member has an inclined surface, which is tapered from
the external surface toward an internal surface, on at
least one of the side surfaces, and has a protrusion,
which extends on at least one of the side surfaces side,
on the internal surface.

20. The method for manufacturing a hollow container as claimed in claim 19, wherein, in the joining step, the rotary tool is moved over around the first metal member and the second metal member.

21. The method for manufacturing a hollow container as claimed in claim 19, wherein the first metal member and the second metal member are made of a casting material, and the auxiliary member is made of an wrought aluminum alloy material.

22. A method for manufacturing a hollow container with use of a rotary tool including a tapered stirring pin, the method comprising:

preparing a first metal member having a concave portion which is formed by a bottom and a peripheral wall extending from a peripheral edge of the bottom, a second metal member having a plate shape, and an auxiliary member having a frame structure corresponding to an end surface of the peripheral wall of the first metal member and a peripheral edge on an internal surface of the second metal member;

butting, in which the end surface of the peripheral wall of the first metal member and the peripheral edge on the internal surface of the second metal member are faced with each other, the auxiliary member is interposed in a gap between the end surface and the peripheral edge, the end surface of the peripheral wall of the first metal member is butted against one side surface of the auxiliary member to form a first butted portion, and the peripheral edge on the internal surface of the second metal member is butted against the other side surface of the auxiliary member to form a second butted portion; and joining, in which the rotating rotary tool is inserted only through an external surface of the auxiliary member and is relatively moved along the first butted portion and the second butted portion, with only the stirring pin contacting the auxiliary member and an outer peripheral surface of the stirring pin contacting the first and second metal members, to join the first metal member to the second metal member via the auxiliary member with a contact margin between the outer peripheral surface of the stirring pin and the end surfaces set to be less than 1.0 mm, wherein the first metal member, the second metal member, and the auxiliary member are made of aluminum or an aluminum alloy, and the first metal member and the second metal member have higher hardness than the auxiliary member, and the end surface of the peripheral wall of the first metal member and the peripheral edge on the internal surface of the second metal member have inclined surfaces to face outward, and the auxiliary member has inclined surfaces, which are tapered from the external surface toward an internal surface, on both of the side surfaces, and has a protrusion, which extends on at least one of the side surfaces side, on the internal surface.

23. The method for manufacturing a hollow container as claimed in claim 22, wherein, in the joining step, the rotary tool is moved over around the first metal member and the second metal member.

24. The method for manufacturing a hollow container as claimed in claim 22, wherein the first metal member and the second metal member are made of a casting material, and the auxiliary member is made of an wrought aluminum alloy material.

* * * * *